US009401787B2

(12) United States Patent
Qi et al.

(10) Patent No.: US 9,401,787 B2
(45) Date of Patent: Jul. 26, 2016

(54) METHOD AND APPARATUS FOR PROVIDING AN EFFICIENT PILOT PATTERN

(75) Inventors: Xin Qi, Beijing (CN); Jianfeng Kang, Beijing (CN); Chao Wei, Beijing (CN)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 1466 days.

(21) Appl. No.: 12/263,497

(22) Filed: Nov. 2, 2008

(65) Prior Publication Data

US 2010/0278221 A1    Nov. 4, 2010

Related U.S. Application Data

(60) Provisional application No. 61/059,442, filed on Jun. 6, 2008, provisional application No. 60/985,042, filed on Nov. 2, 2007.

(51) Int. Cl.
*H04L 27/00* (2006.01)
*H04L 25/08* (2006.01)
*H04L 5/00* (2006.01)
*H04L 25/02* (2006.01)

(52) U.S. Cl.
CPC .......... *H04L 5/0048* (2013.01); *H04L 5/0007* (2013.01); *H04L 25/0226* (2013.01); *H04L 25/0232* (2013.01); *H04L 5/0023* (2013.01); *H04L 5/0064* (2013.01)

(58) Field of Classification Search
USPC ......... 375/260, 295, 316, 219, 220, 222, 240, 375/240.11, 240.26, 240.27, 259, 285, 284, 375/278, 299, 324, 340, 346, 348, 349, 354, 375/362
See application file for complete search history.

(56) References Cited

U.S. PATENT DOCUMENTS

| 7,564,829 | B2* | 7/2009 | Jin ........................ H04L 5/0048 370/321 |
| 8,583,132 | B2* | 11/2013 | Gorokhov ............. H04L 5/0055 370/341 |
| 9,271,221 | B2* | 2/2016 | Tong ..................... H04B 7/0617 |
| 2005/0286408 | A1* | 12/2005 | Jin et al. ........................ 370/208 |
| 2006/0120273 | A1 | 6/2006 | Wang et al. |
| 2006/0209670 | A1 | 9/2006 | Gorokhov et al. |
| 2007/0195899 | A1* | 8/2007 | Bhushan et al. .............. 375/260 |
| 2008/0101441 | A1* | 5/2008 | Palanki ................. H04L 5/0053 375/146 |
| 2008/0273453 | A1* | 11/2008 | Manakkal et al. ........... 370/208 |
| 2009/0016312 | A1* | 1/2009 | Tao ...................... H04B 7/0404 370/344 |
| 2009/0303918 | A1* | 12/2009 | Ma ....................... H04B 7/2606 370/315 |

FOREIGN PATENT DOCUMENTS

WO    WO 2005/022792 A2    3/2005

OTHER PUBLICATIONS

International Preliminary Report on Patentability for corresponding International App. No. PCT/IB2008/054550 dated May 4, 2010, pp. 1-9.
IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands, IEEE Std 802.16e, (5 Attachment Parts).
International Search Report and Written Opinion, PCT/IB2008/054550, Nov. 19, 2009, pp. 1-17.
Partial International Search Report, PCT/IB2008/054550, Sep. 3, 2009, pp. 1-5.

* cited by examiner

*Primary Examiner* — Linda Wong
(74) *Attorney, Agent, or Firm* — Ditthavong & Steiner, P.C.

(57) ABSTRACT

An approach is provided for generating a pilot pattern. A sequence of tiles is generated, wherein the tiles are arranged to avoid redundant pilot sub-carriers by utilizing different pilot patterns. A transmission signal is generated according to the generated sequence for transmission over a network.

22 Claims, 25 Drawing Sheets

605

607

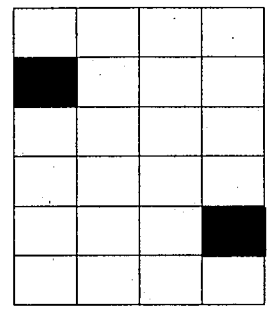
FIG. 6F  MS Antenna #2
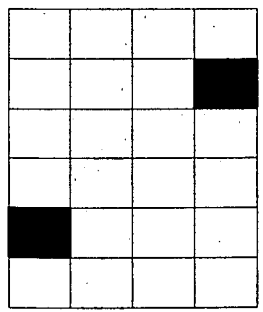
FIG. 6E  MS Antenna #1
609

US 9,401,787 B2

METHOD AND APPARATUS FOR PROVIDING AN EFFICIENT PILOT PATTERN

RELATED APPLICATIONS

This application claims the benefit of the earlier filing date under 35 U.S.C. §119(e) of U.S. Provisional Application Ser. No. 60/985,042 filed Nov. 2, 2007, entitled "Method and Apparatus for Providing an Efficient Pilot Pattern," and U.S. Provisional Application Ser. No. 61/059,442 filed Jun. 6, 2008, entitled "Method and Apparatus for Providing an Efficient Pilot Pattern"; the entireties of which are incorporated herein by reference.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, Orthogonal Frequency Division Multiplexed (OFDMA) networks, spatially multiplexed networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves minimizing overhead to improve bandwidth efficiency, particularly in regards to the use of pilot signals for synchronization.

SOME EXEMPLARY EMBODIMENTS

Therefore, there is a need for an approach for providing efficient pilot patterns, which can co-exist with already developed standards and protocols.

According to one embodiment of the invention, a method comprises generating a sequence of tiles, the tiles being arranged to avoid redundant pilot sub-carriers by utilizing different pilot patterns. The method also comprises generating a transmission signal according to the generated sequence for transmission over a network.

According to another embodiment of the invention, an apparatus comprises logic configured to generate a sequence of tiles, the tiles being arranged to avoid redundant pilot sub-carriers by utilizing different pilot patterns. The logic is further configured to generate a transmission signal according to the generated sequence for transmission over a network.

According to another embodiment of the invention, a method comprises storing a first tile representing sub-carriers within a time-frequency domain, the first tile being a 4*3 tile with two pilot sub-carriers. The method also comprises storing a second tile representing sub-carriers within a time-frequency domain, the second tile being a 4*3 tile with four pilot sub-carriers. Further, the method comprises generating a sequence of tiles including the first tile and a second tile.

According to yet another embodiment of the invention, an apparatus comprises a memory configured to store a first tile representing sub-carriers within a time-frequency domain, the first tile being a 4*3 tile with two pilot sub-carriers, the memory being further configured to store a second tile representing sub-carriers within a time-frequency domain, the second tile being a 4*3 tile with four pilot sub-carriers. The apparatus further comprises logic configured to generate a sequence of tiles including the first tile and a second tile.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6F are diagrams of pilot patterns, according to various embodiments;

DESCRIPTION OF PREFERRED EMBODIMENT

An apparatus, method, and software for providing pilot patterns are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with a WiMAX (Worldwide Interoperability for Microwave Access) communication network (e.g., compliant with Institute of Electrical & Electronics Engineers (IEEE) 802.16), a 3GPP LTE or EUTRAN (Enhanced UMTS (Universal Mobile Telecommunications System) Terrestrial Radio Access Network)) architecture, it is recognized by one of ordinary skill in the art that the embodiments of the inventions have applicability to any type of packet based communication system and equivalent functional capabilities.

Figure 1A:
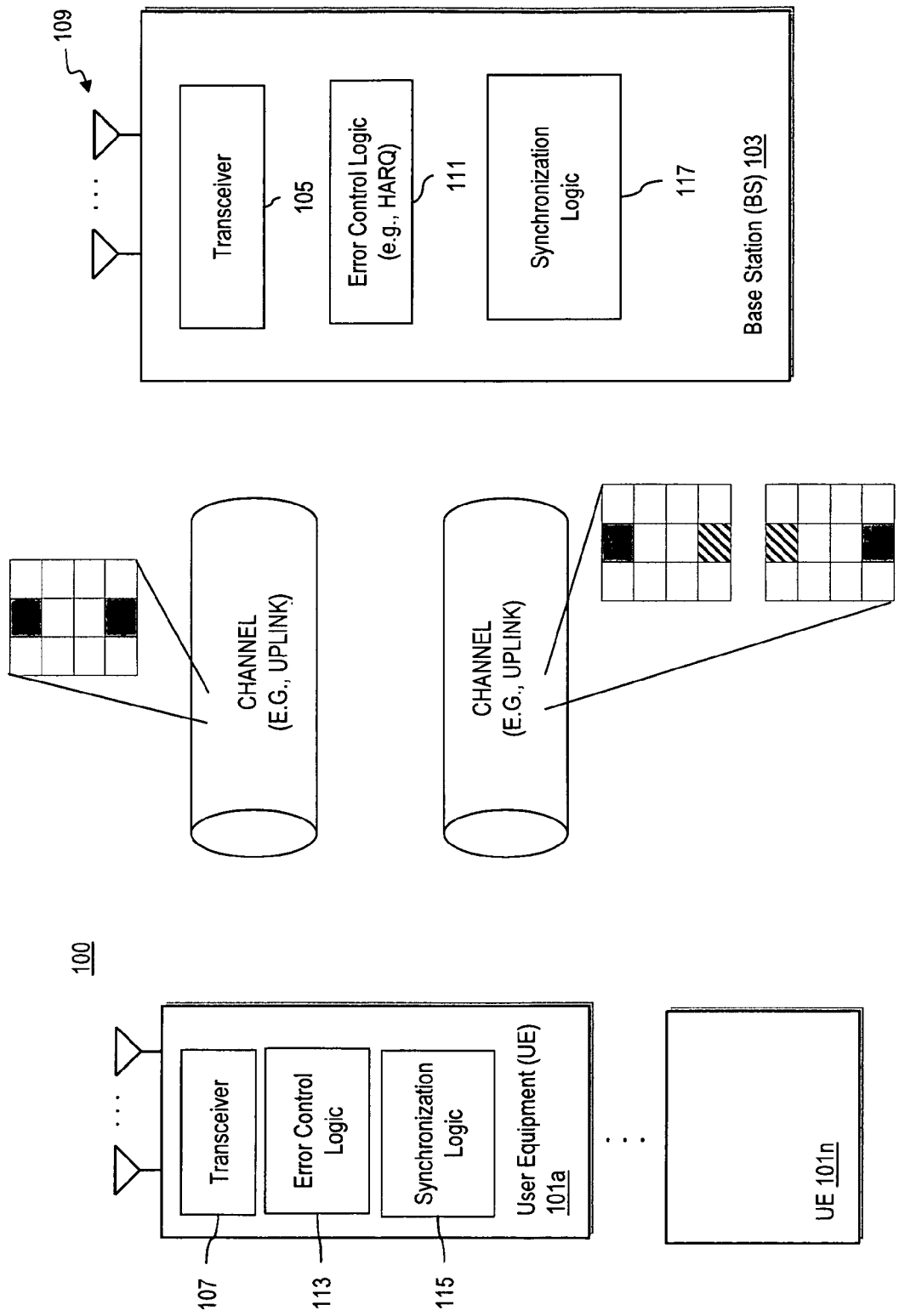
FIGS. 1A and 1B are, respectively, a diagram of a communication system capable of utilizing a tile that provides an efficient pilot pattern, and a flowchart of a process for generating a signal in accordance with the tile, according to various exemplary embodiments of the invention.
Figure 1B:
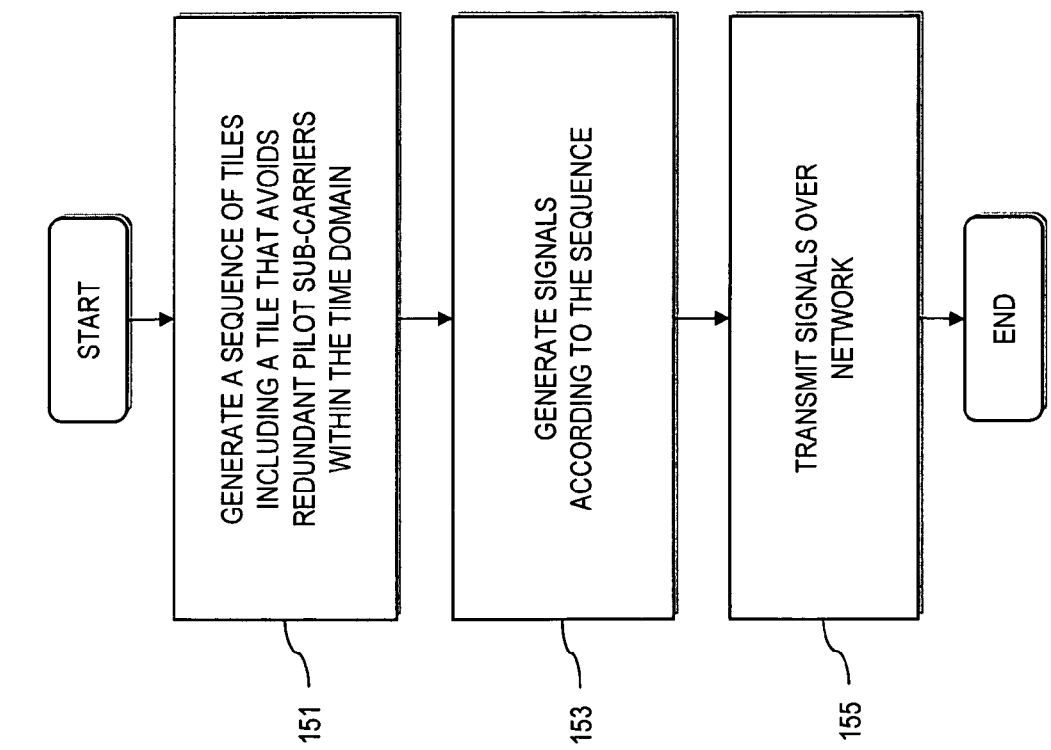
Figure 11A:
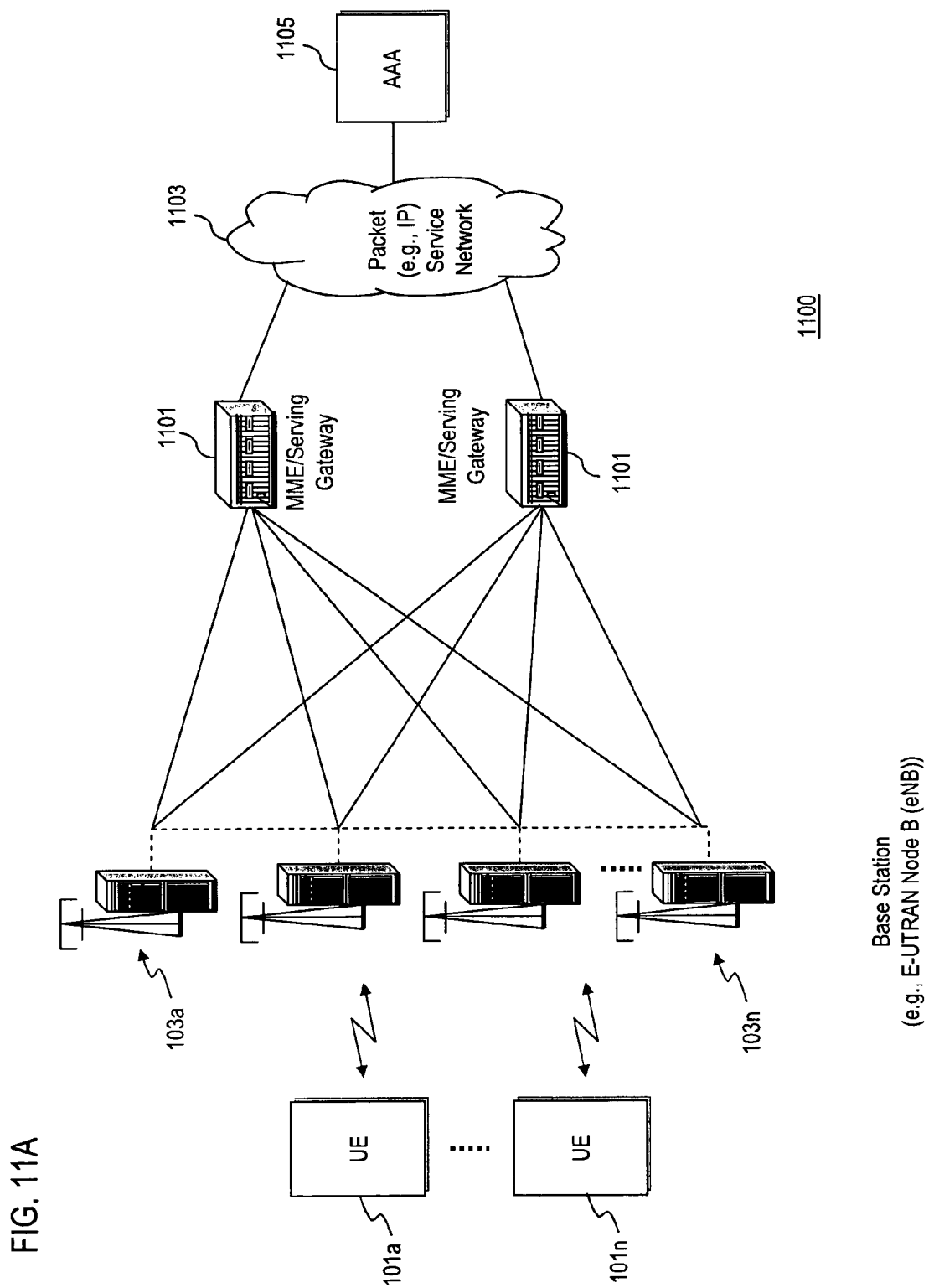
FIGS. 11A-11C are diagrams of communication systems having exemplary long-term evolution (LTE) architectures, in which the user equipment (UE) and the base station of FIG. 1A can operate, according to various exemplary embodiments of the invention.
Figure 11B:
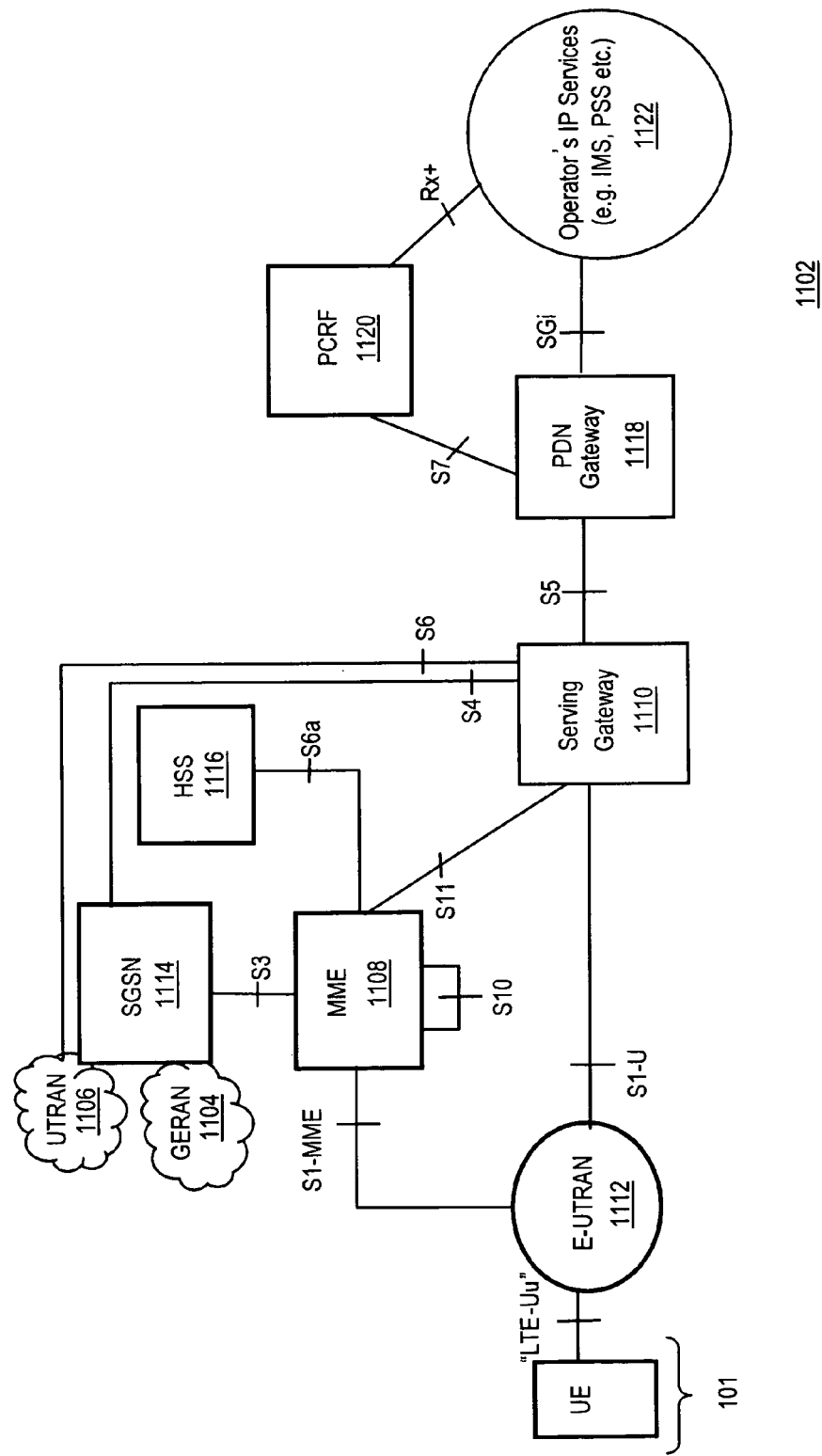
Figure 11C:
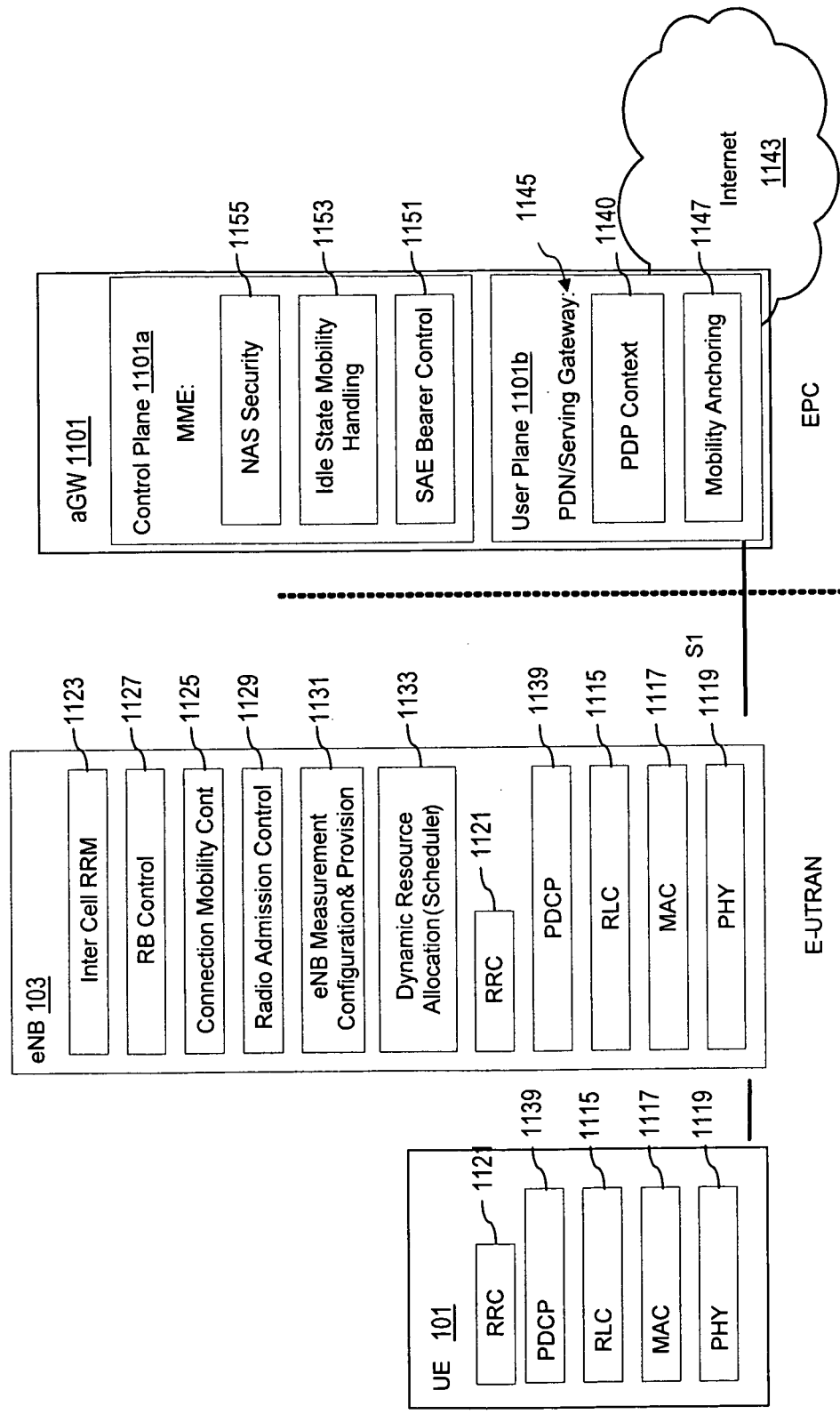

FIGS. 1A and 1B are, respectively, a diagram of a communication system capable of utilizing a tile that provides an efficient pilot pattern, and a flowchart of a process for generating a signal in accordance with the tile, according to various exemplary embodiments of the invention. As shown in FIG. 1, a communication system 100 includes one or more user equipment (UEs) 101a-101n communicating with a base station 103, which is part of an access network (e.g., 3GPP LTE (or E-UTRAN), WiMAX, etc.). For example, under the 3GPP LTE architecture (as shown in FIGS. 11A-11C), the base station 103 is denoted as an enhanced Node B (eNB). The UE 101 can be any type of mobile stations, such as handsets, terminals, stations, units, devices, multimedia tablets, Internet nodes, communicators, Personal Digital Assistants or any type of interface to the user (such as "wearable" circuitry, etc.). The UE 101 can communicate with the base station 103 wirelessly, or through a wired connection. For example, UE 101a wirelessly connects to the base station 103a, while the UE 101n can be a wired terminal, which is linked to the base station 103n. The communication system 100 can extend network coverage through the use of one or more relay nodes (shown in FIG. 2).

In the wireless case, the base station 103a employs a transceiver 105, which transmits information to the UE 101a via one or more antennas 109 for transmitting and receiving electromagnetic signals. The UE 101a, likewise, employs a transceiver 107 to receive such signals. For instance, the base station 103a may utilize a Multiple Input Multiple Output (MIMO) antenna system 109 for supporting the parallel transmission of independent data streams to achieve high data rates between the UE 101a and base station 103a. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

The UE 101 and base station 103 include error control logic 111, 113, respectively, for executing a hybrid Automatic Repeat Request (ARQ) (HARQ) scheme, as well as an acknowledgement signaling logic. Automatic Repeat Request (ARQ) is an error detection mechanism used on the link layer. This mechanism permits a receiver to indicate to the transmitter that a packet or sub-packet has been received incorrectly, and thus, requests the transmitter to resend the particular packet(s). In the system 100, either of the UE 101 or BS 103 can behave as a receiver or transmitter at any particular time.

The system 100 provides an acknowledgement (ACK) channel that supports multiple HARQ-enabled connections from a single UE or multiple UEs. According to one embodiment, the system 100 utilizes a coding and modulation (CM) method for the ACK channel when UL (Uplink) PUSC (Partial Usage of Sub Channels) is used. The UL ACK/NAK (Negative Acknowledgement) provides feedback for DL (Downlink) HARQ.

The system 100 provides for constructing pilot patterns for both single-antenna and multi-antenna scenarios when UL (Uplink) PUSC (Partial Usage of Subchannels) permutation is used, by which the number of pilot subcarriers can be reduced. In an exemplary embodiment, the relative improvement in the number of data subcarriers is 6.25%-10.7%. Thus, the approach, according to certain embodiments, can improve UL bandwidth efficiency, while resulting in little or no performance degradation in terms of channel estimation. This can be accomplished by synchronization logic 115 and 117 residing in the UEs 101 and base station 103, respectively.

By way of example, the UE 101 and the base station 103 can communicate according to an air interface defined by IEEE 802.16. Details of various IEEE 802.16 protocols are more fully described in the following references, along with additional background materials (which are incorporated herein by reference in their entireties): [1] IEEE 802.16-2004, "IEEE Standard for Local and Metropolitan Area Networks—Part 16: Air Interface for Fixed Broadband Wireless Access Systems," Jun. 24, 2004; [2] IEEE 802.16e-2005, "IEEE Standard for Local and Metropolitan Area Networks—Part 16: Air Interface for Fixed and Mobile Broadband Wireless Access Systems," Feb. 28, 2006'; [3] Draft IEEE 802.16m Requirements, [online] http://www.ieee802.org/16/tgm/docs/80216m-07_002r3.pdf; and [4] WiMAX Forum™ Mobile System Profile, Release 1.0 Approved Specification (Revision 1.4.0: 2007 May 2), [online] http://www.wimaxforum.org/technology/documents.

According to certain embodiments, a new pilot pattern (e.g., see FIG. 5A) is constructed to reduce the number of redundant pilot subcarriers with little compensation in channel estimation, thereby effectively increasing the number of data subcarriers—i.e., improving the spectrum efficiency of the system.

Figure 3A:
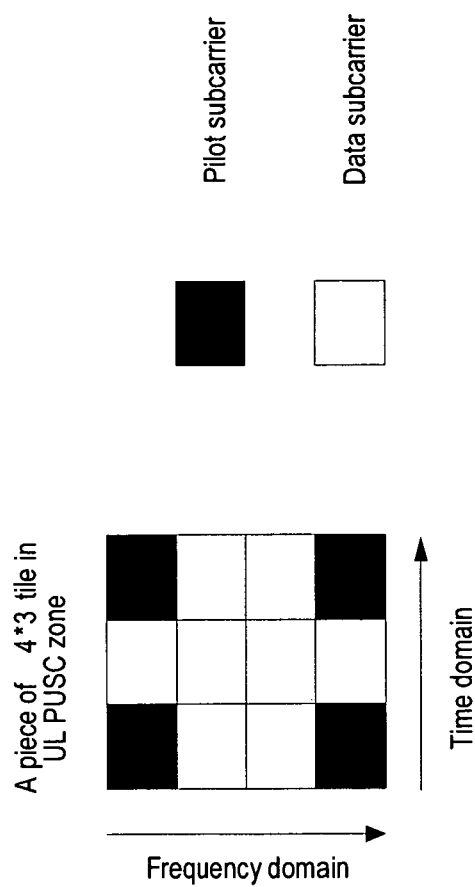
FIGS. 3A and 3B are diagrams of an exemplary tile structure and a bandwidth allocation process based on the tile structure.

As shown in FIG. 1B, in step 151, a sequence of tiles are generated. In one embodiment, the tile includes a new pilot pattern; namely, the new tile avoids use of redundant pilot sub-carriers within the time domain (such conventional, redundant pilot pattern is shown in FIG. 3A). Next, transmission signals are generated according to the sequence, as in step 153. These signals can then be transmitted over the system 100, per step 155.

Figure 2:
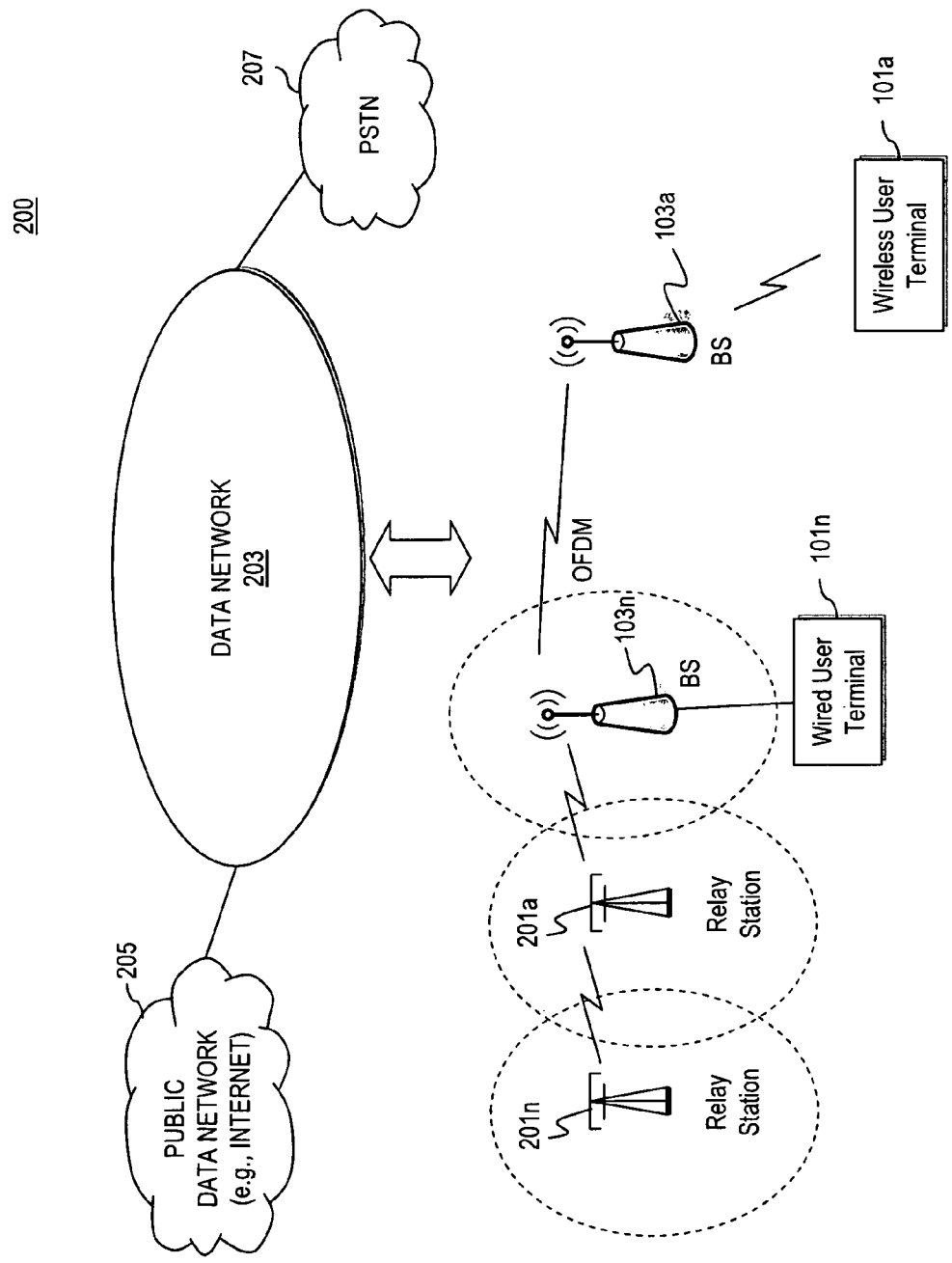
FIG. 2 is a diagram of a radio communication system capable of providing efficient synchronization, according to various embodiments.

FIG. 2 is a diagram of a radio communication system capable of providing efficient synchronization, according to various embodiments. For the purposes of illustration, the communication system 200 of FIG. 2 is described with respect to a wireless mesh network (WMN) using WiMAX (Worldwide Interoperability for Microwave Access) technology for fixed and mobile broadband access. WiMAX, similar to that of cellular technology, employs service areas that are divided into cells. As shown, multiple base stations 103a-103n or base transceiver stations (BTSs)—constitute the radio access network (RAN). WiMAX can operate using Line Of Sight (LOS) as well as near/non LOS (NLOS). The radio access network, which comprises the base stations 103 and relay stations 201a-201n, communicates with a data network 203 (e.g., packet switched network), which has connectivity to a public data network 205 (e.g., the global Internet) and a circuit-switched telephony network 207, such as the Public Switched Telephone Network (PSTN).

In an exemplary embodiment, the communication system of FIG. 2 is compliant with IEEE 802.16. The IEEE 802.16 standard provides for fixed wireless broadband Metropolitan Area Networks (MANs), and defines six channel models, from LOS to NLOS, for fixed-wireless systems operating in license-exempt frequencies from 2 GHz to 11 GHz. In an exemplary embodiment, each of the base stations 103 uses a medium access control layer (MAC) to allocate uplink and downlink bandwidth. As shown, Orthogonal Frequency Division Multiplexing (OFDM) is utilized to communicate from one base station to another base station. For example, IEEE 802.16x defines a MAC (media access control) layer that supports multiple physical layer (PHY) specifications. For instance, IEEE 802.16a specifies three PHY options: an OFDM with 256 sub-carriers; OFDMA, with 2048 sub-carriers; and a single carrier option for addressing multipath problems. Additionally, IEEE 802.16a provides for adaptive modulation. For example, IEEE 802.16j specifies a multihop relay network, which can employ one or more relay stations to extend radio coverage.

The service areas of the RAN can extend, for instance, from 31 to 50 miles (e.g., using 2-11 GHz). The RAN can utilize point-to-multipoint or mesh topologies. Under the mobile standard, users can communicate via handsets within about a 50 mile range. Furthermore, the radio access network can support IEEE 802.11 hotspots.

The communication system of FIG. 2 can, according to one embodiment, provide both frequency and time division duplexing (FDD and TDD). It is contemplated that either duplexing scheme can be utilized. With FDD, two channel pairs (one for transmission and one for reception) are used, while TDD employs a single channel for both transmission and reception.

Figure 3B:
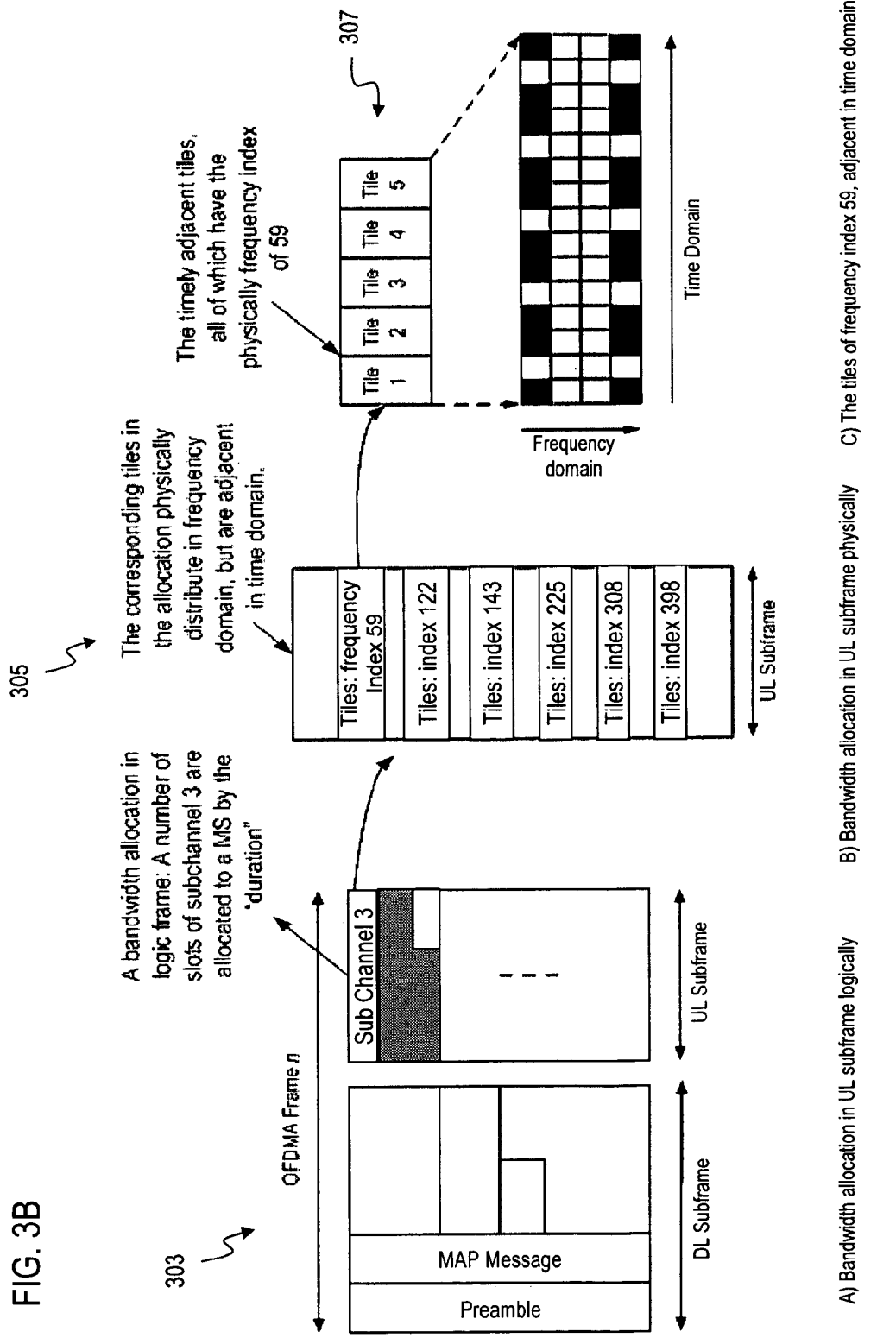

FIGS. 3A and 3B are diagrams of an exemplary tile structure and a bandwidth allocation process based on the tile structure. For the purposes of illustration, the pilot signals are described with respect to an UL PUSC zone 301. In the UL PUSC zone 301, a tile is defined to be a 4*3 piece of subcarriers in time-frequency domain. The UL bandwidth allocation in the UL PUSC zone uses "duration", i.e., a number of adjacent slots in time domain are allocated to MS (when "subchannel rotation" is disabled). It is noted that "subchannel rotation" is defined to be optional in WIMAX Profile (see WiMAX Forum™ Mobile System Profile, Release 1.0 Approved Specification (Revision 1.4.0: 2007 May 2), Table 13, which is incorporated herein by reference in its entirety). And the "disabling" of "subchannel rotation" can be executed by, e.g., using the "Disable subchannel rotation" bit of "UL Zone IE", which has been defined in the revision of the 802.16 specification P80216Rev2_D1.

The UL PUSC bandwidth allocation is explained herein by using the example in section 8.4.6.2.3 in IEEE 802.16e-2005, "IEEE Standard for Local and Metropolitan Area Networks—Part 16: Air Interface for Fixed and Mobile Broadband Wireless Access Systems," Feb. 28, 2006. In the example, subchannel 3 contains physical tiles 59, 122, 143, 225, 308, 398, as shown in FIG. 3B.

In the transmission frame 303, it is assumed that 5 slots of subchannel 3 are allocated to one burst of a MS using UL-MAP-IE, for instance. The tiles of subchannel 3 are not physically adjacent to each other in frequency domain. However, the tiles of the 5 slots with the same frequency index are adjacent to each other in time domain, as shown in UL sub-frame 305 for the tiles 307 with frequency index 59. It is noted that "subcarriers (or tiles) being adjacent in time domain" means that the subcarriers (or tiles) are of the same frequency index physically and in adjacent OFDM (Orthogonal Frequency Division Multiplexing) symbols in time domain.

Figure 4:
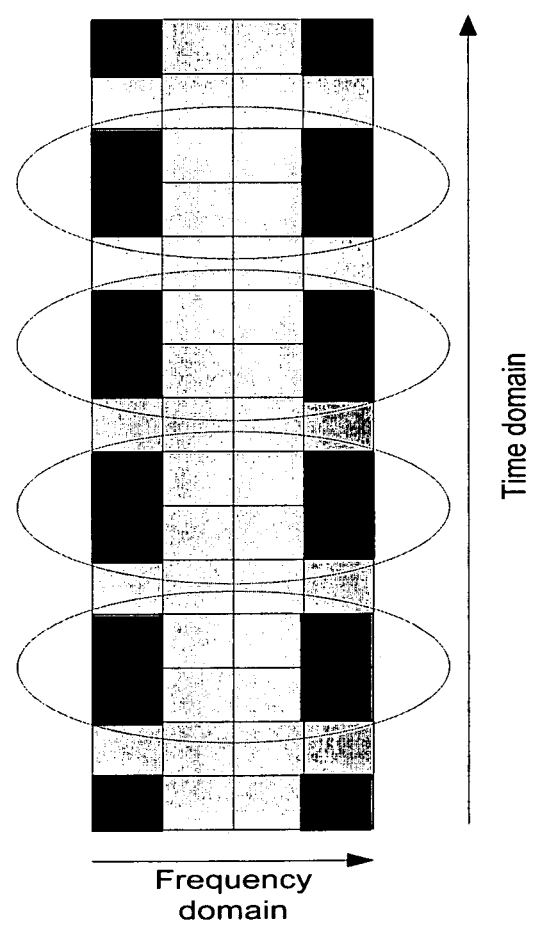
FIG. 4 is a conventional bandwidth allocation structure employing redundant pilots that are adjacent in the time domain.

FIG. 4 is a conventional bandwidth allocation structure employing redundant pilots that are adjacent in the time domain. The pilot pattern for a single tile in the UL PUSC zone 301 is rather well-designed; however, from FIG. 3B, it can be seen that when multiple slots adjacent in time are allocated to one UL burst, there are some pilot subcarriers adjacent in time domain. The redundant pilot subcarriers are highlighted by the circles in the tiles 401.

Figure 5A:
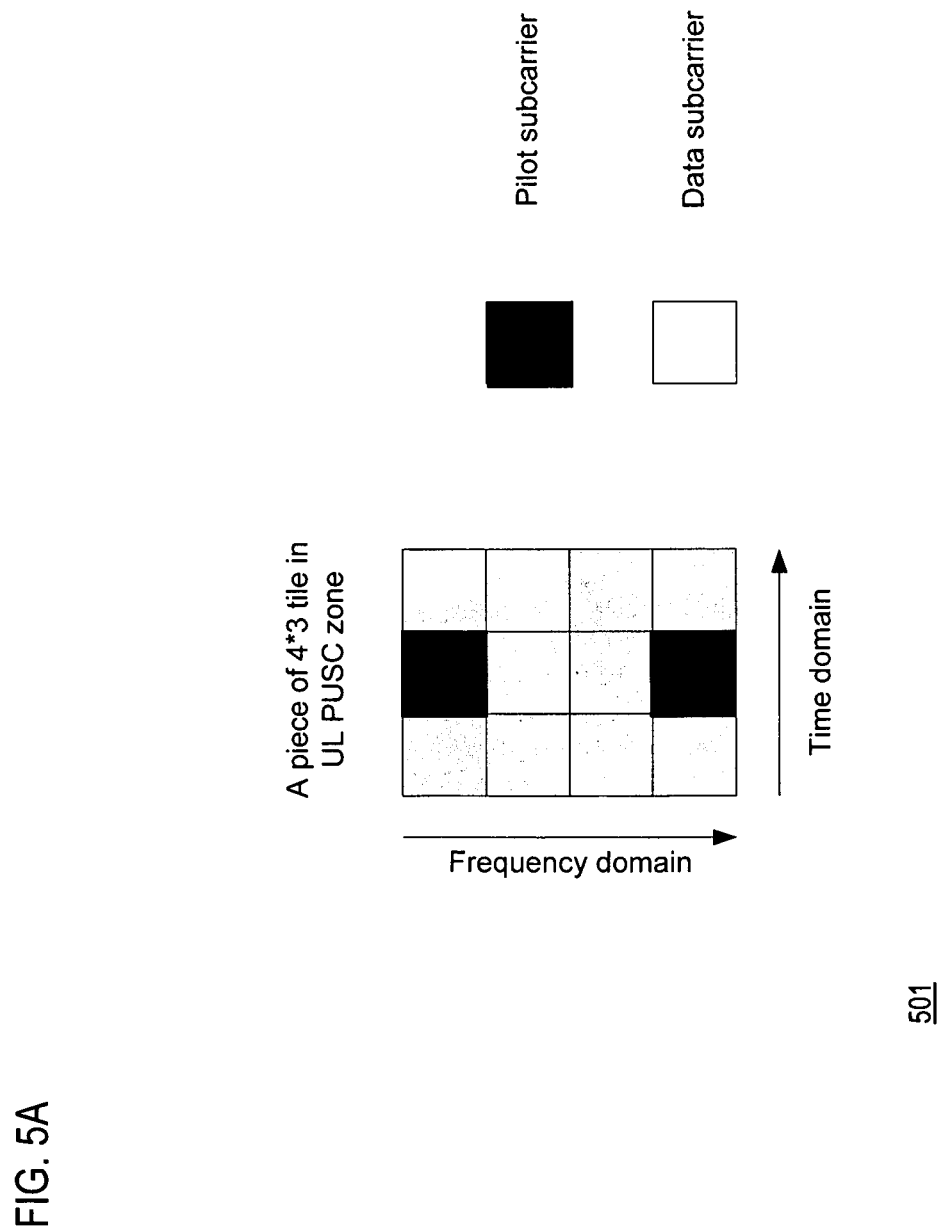
FIGS. 5A and 5B are diagrams, respectively, of a tile with a pilot pattern for use in a single antenna scenario, and exemplary sequences of tiles utilizing the tile of FIG. 5A, according to various embodiments.
Figure 5B:
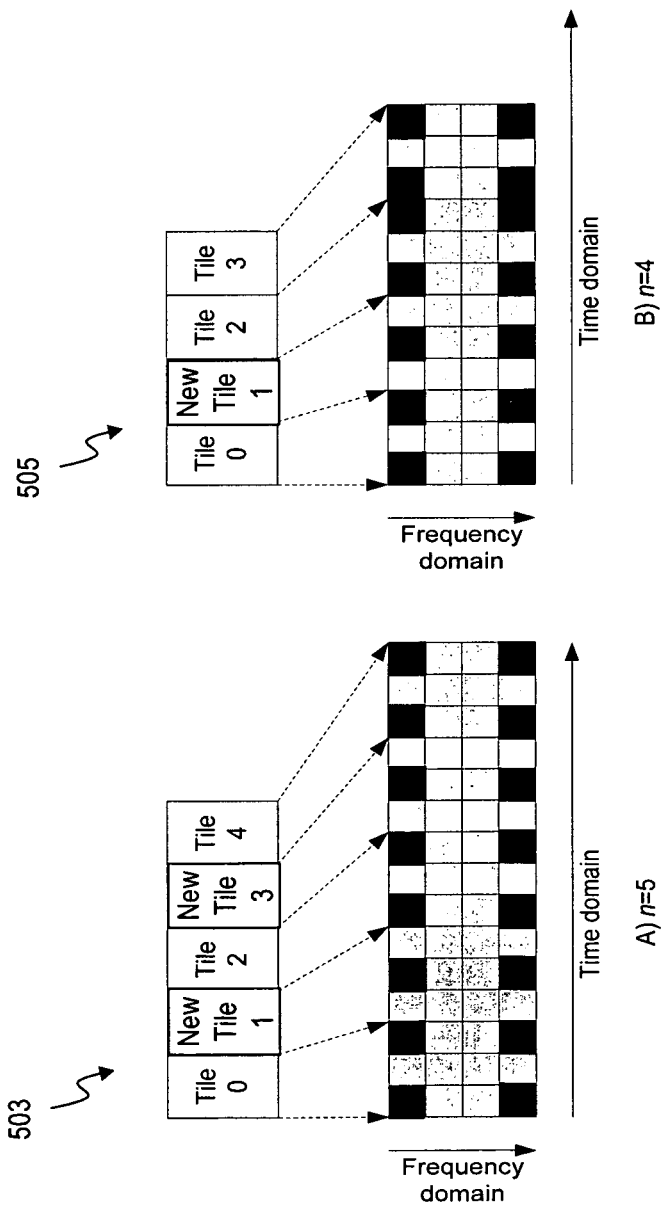

FIGS. 5A and 5B are diagrams, respectively, of a tile with a pilot pattern for use in a single antenna scenario, and exemplary sequences of tiles utilizing the tile of FIG. 5A, according to various embodiments. For the single-antenna case, the new pilot pattern is given by the following rule. As seen in FIG. 5A, a new pilot pattern for PUSC tile 501 is defined. Compared with the 16e PUSC tile, the number of pilot subcarriers is reduced from 4 to 2, which saves 2 pilot subcarriers per tile for data. This pattern 501 is used to generate a tile sequence, as later described with respect to FIG. 8A.

It is assumed that there are n (>2) slots adjacent in time domain, and are allocated to one burst of a UE or MS 101. Thus, there are 6 sequences of tiles adjacent in time domain allocated to the MS 101; and there are n tiles in each tile sequence. For each sequence of tiles, each of the n tiles is assigned a natural index k, k=0, 1, . . . , n−1. For the tiles whose indexes are k=2j+1, j=0, 1 . . . , ⌊(n−1)/2⌋−1, the pilot pattern defined in FIG. 5A is used. For other tiles, the 802.16e pilot pattern in FIG. 3A is used. Alternatively, for the tiles whose indexes are k=2j, j=0, 1 . . . , ⌊(n−1)/2⌋−1, the pilot pattern defined in FIG. 5A is used. For other tiles, the 802.16e pilot pattern in FIG. 3A is used.

According to one embodiment, pilots can be distributed evenly in the whole resource allocation, and the redundant pilot subcarriers are reduced. The two exemplary patterns 503, 505 in FIG. 5B are for the cases of n=5 and n=4. The bandwidth improvement of the two examples are 4/(5*8)=10% and 2/(4*8)=6.25%, respectively. It is noted that 6.25% is the worst case of the improvement in bandwidth efficiency by using the process of FIG. 8A. For example, according to the WIMAX Profile, the UL subframe normally has 9 to 21 OFDM symbols. Therefore, the maximum bandwidth improvement should happen in the case of 7 tiles adjacent to each other (21 OFDM symbols), which is 6/(7*8)=10.7%.

To verify the benefit of this approach, analysis of the performance degradation of channel estimation is provided. Specifically, this problem is an analyzed problem based on two types of channel estimation method—namely, linear interpolation channel estimation and time-frequency Wiener filter channel estimation (FIGS. 6A and 6B).

Figure 6A:
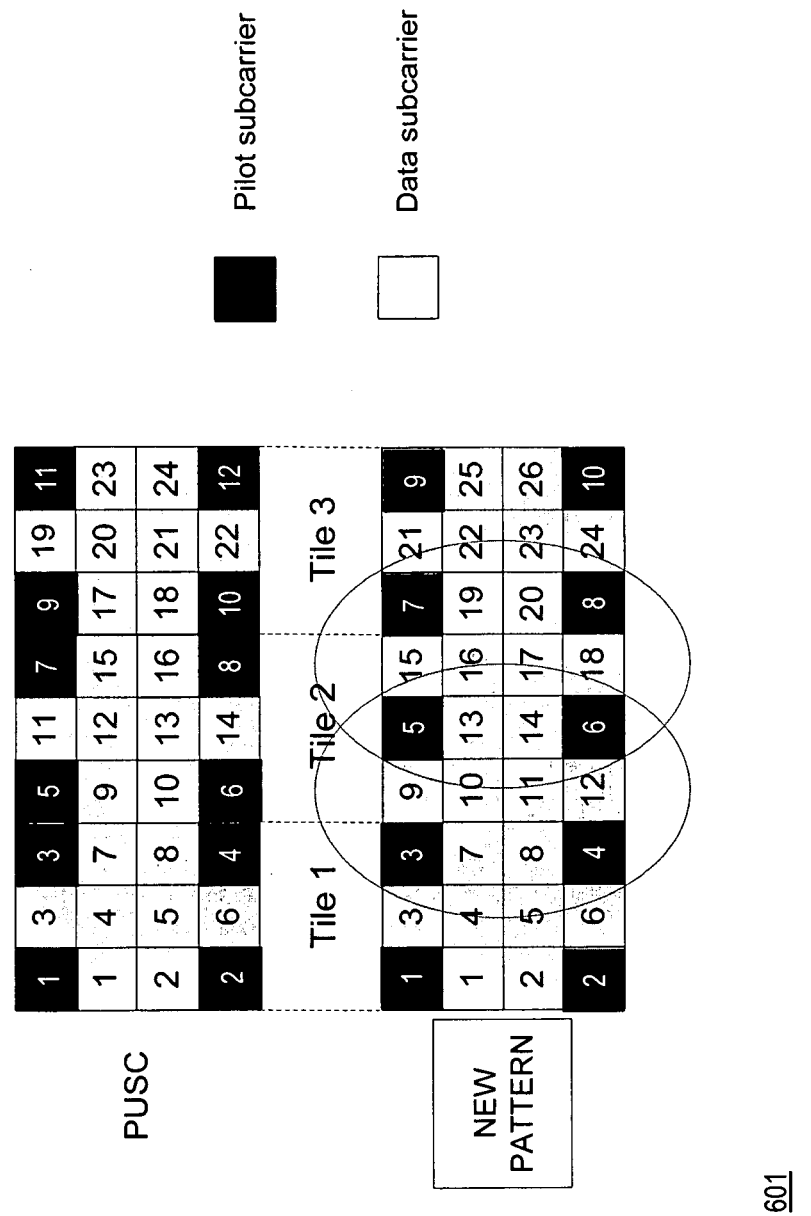
Figure 6B:

FIGS. 6A-6F are diagrams of pilot patterns, according to various embodiments. Specifically, FIGS. 6A and 6B are, respectively, a diagram showing linear interpolation channel estimation of three adjacent tiles with two pilot patterns, and a diagram showing Wiener channel estimation of three adjacent tiles with various pilot patterns. This analysis, by way of example, is provided for a single-antenna system. As used herein, linear interpolation channel estimation means that the channel state information (CSI) of data subcarriers is estimated by utilizing linear computation of the CSI (Channel State Information) of the 4 pilot subcarriers in a tile.

As seen in FIG. 6A, for the case of tiles 601 using 16e PUSC pilot pattern, the channel estimation of tile 1, i.e., data subcarriers 1 to 8, is executed by the linear computation based on pilot subcarriers 1 to 4. The channel estimation of tile 2 is performed by the linear computation based on pilot subcarriers 5 to 8, and so on. For the case of the tiles utilizing the new pilot pattern 501 (FIG. 5A), tile 1 and 3 uses the same method with the PUSC case. For the channel estimation of tile 2, the data subcarriers are split into two groups, the CSI of data subcarriers 9 to 14 are estimated by the CSI of pilot subcarriers 3 to 6, and the CSI of data subcarriers 15 to 18 are estimated by the CSI of pilot subcarriers 5 to 8. In this manner, the CSI of all the data subcarriers in tile 2 are estimated by the same method as other tiles with PUSC pilot pattern. Thus, the channel estimation of tile 2 appears to provide the same performance with the other two tiles, with no increase in computational complexity of channel estimation per data subcarrier.

Therefore, when linear-interpolation channel estimation is used, there is no performance degradation, and no more computational complexity. This conclusion is important, proving that with common channel estimation method, the approach of FIGS. 5A and 5B offer concrete bandwidth efficiency improvement without performance compensation.

As for the analysis of time-frequency Wiener filter channel estimation, the performance of the best channel estimation method can also be analyzed in terms of mean-square-error (MSE), which is time-frequency two-dimensional (2-D) Wiener filter. The channel impulse response of time-variable channel could be written as:

$$h(t, \tau) = \sum_{l=0}^{L-1} \alpha_l(t) \delta(\tau - \tau_l) \tag{1}$$

where L is the number of distinguishable paths. Then, the frequency response of the channel in time t is as follows:

$$H(t, f) = \int_{-\infty}^{\infty} h(t, \tau) e^{-j2\pi f \tau} d\tau = \sum_{l=0}^{L-1} \alpha_l(t) e^{-j2\pi f \tau_l} \tag{2}$$

It is assumed that $\alpha_l(t)$ have the following correlation function in time domain $$r_{\alpha_l}(t+\Delta t, t) = E\{\alpha_l(t+\Delta t) \cdot \alpha_l^*(t)\} = \sigma_l^2 r_t(\Delta t) \tag{3}$$

Also, it is assumed that different paths are independent, the correlation function in frequency domain is $$r_H(\Delta t, \Delta f) = E\{H(t+\Delta t, f+\Delta f) \cdot H^*(t, f)\} \tag{4}$$

$$= \sum_{l=0}^{L-1} r_{\alpha_l}(\Delta t) e^{-j2\pi \Delta f \tau_l}$$

$$= r_t(\Delta t) \sum_{l=0}^{L-1} \sigma_l^2 e^{-j2\pi \Delta f \tau_l}$$

The channel is normalized as $$\sum_{l=0}^{L-1} \sigma_l^2 = 1 \tag{5}$$

and $r_t(\Delta t)$ can be computed using the zero-order Bessel function of $1^{st}$ kind (which is further detailed in Andrea Goldsmith, Wireless Communications, Cambridge University Press, 2004; which is incorporated herein by reference in its entirety). The Doppler frequency spread is denoted as $f_d$.

$$r_t(\Delta t) = J_0(2\pi f_d \Delta t) \tag{6}$$

After switching to discrete index, the correlation function in frequency domain could be written as $$H(n, k) = H\left(nT, k\frac{1}{NT_s}\right) = \sum_{l=0}^{L-1} \alpha_l(nT) e^{-j2\pi \frac{l k}{N}} \tag{7}$$

$$r_H(n, k) = r_H\left(nT, k\frac{1}{NT_s}\right) == r_t(nT) \sum_{l=0}^{L-1} \sigma_l^2 e^{-j2\pi \frac{l k}{N}}$$

where $T_s$ is the sampling time, and T is the time of OFDM symbol (including cyclic prefix):

$$T = (N_{CP} + N_{FFT}) \cdot T_s \tag{8}$$

and n denotes the n-th OFDM symbol, k denotes the k-th subcarrier. Considering the 802.16 OFDMA (Orthogonal Frequency Division Multiplexing Access) system, it is assumed that all pilots are modulated to "1"; and the channel does not change during the time of one OFDM symbol time T. The corresponding received signal could be written as:

$$\vec{Y} = \vec{H} + \vec{N} = \begin{pmatrix} H(n_1, k_1) \\ H(n_2, k_2) \\ \vdots \\ H(n_P, k_P) \end{pmatrix} + \vec{N} \tag{9}$$

All the vectors in (9) are P×1 vectors, P=1, 2, 3, . . . . $\vec{H}$ could include any number and combination of pilots. $n_p$ and $k_p$ are the index for the pilot in time and frequency domain, respectively. $\vec{N}$ is the vector of complex additive white Gaussian noise, the variance of each of which is $\sigma_n^2$. For example, for a UL PUSC tile, $\vec{Y}$ could correspond to the 4 pilots of the first tile in frequency domain:

$$\vec{Y} = \begin{pmatrix} H(1, 1) \\ H(3, 1) \\ H(1, 4) \\ H(3, 4) \end{pmatrix} + \vec{N} \tag{10}$$

Using the time-frequency 2-D Wiener, the channel estimation results could be written as:

$$\hat{H}(n, k) = \vec{W}(n, k) \vec{Y} \tag{11}$$

where

-continued $$\vec{W}(n,k) = \vec{r}_{H(n,k)\vec{Y}} \cdot \vec{r}_{\vec{Y}\vec{Y}}^{-1} \quad (12)$$

where $$\vec{r}_{H(n,k)\vec{Y}} = E\{H(n,k) \cdot \vec{Y}^H\} \quad (13)$$

$$= E\left\{H(n,k) \cdot \begin{pmatrix} H^*(n_1,k_1), H^*(n_2,k_2), \\ \cdots H^*(n_P,k_P) \end{pmatrix}\right\}$$

$$= \begin{pmatrix} r_H(n-n_1, k-k_1), r_H(n-n_2, k-k_2), \\ \cdots r_H(n-n_P, k-k_P) \end{pmatrix}$$

$$\vec{r}_{\vec{Y}\vec{Y}} = E\{\vec{Y}\vec{Y}^H\} \quad (14)$$

$$= E\{\overline{HH}^H\} + \sigma_n^2 I$$

$$= \begin{bmatrix} r_H(0,0) & r_H\begin{pmatrix} n_1-n_2, \\ k_1-k_2 \end{pmatrix} & \cdots & r_H\begin{pmatrix} n_1-n_P, \\ k_1-k_P \end{pmatrix} \\ r_H^*\begin{pmatrix} n_1-n_2, \\ k_1-k_2 \end{pmatrix} & r_H(0,0) & \cdots & \vdots \\ \vdots & \vdots & \ddots & \vdots \\ r_H^*\begin{pmatrix} n_1-n_P, \\ k_1-k_P \end{pmatrix} & \cdots & \cdots & r_H(0,0) \end{bmatrix} +$$

$$\sigma_n^2 I$$

Finally, the MSE of the 2-D Wiener channel estimation is $$E\{|\hat{H}(n,k)-H(n,k)|^2\} = E\{|H(n,k)|^2\} - 2Re\{\vec{W}$$
$$(n,k) \cdot \vec{r}_{\vec{Y}H(n,k)}\} + \vec{W}(n,k) \cdot \vec{r}_{\vec{Y}\vec{Y}} \cdot \vec{W}^H(n,k) \quad (15)$$

where $E\{|H(n,k)|^2\}$ equals to 1 according to (5).

The performance of 2-D Wiener Channel Estimation of various pilot pattern is compared in terms of MSE. Three pilot patterns 603 are considered: PUSC, OPUSC (Optional PUSC) and the new pilot pattern. In all the three cases, the average channel estimation MSE of all the data subcarriers of the middle tile of the 3 adjacent ones is computed (FIG. 6B). All the pilots in FIG. 6B are utilized for the channel estimation—which mean for the case of PUSC, the computation is based on the 12 pilot subcarriers. For OPUSC, it is based on 3 pilot subcarriers; and for the new pilot pattern, it is based on 10 pilot subcarriers. It is noted that in the computation, the power boosting of OPUSC pilots is considered according to the section 8.4.9.4.3 in IEEE 802.16e-2005, "IEEE Standard for Local and Metropolitan Area Networks—Part 16: Air Interface for Fixed and Mobile Broadband Wireless Access Systems," Feb. 28, 2006.

The parameters for the system configuration are summarized in Table 1.

TABLE 1

| Parameter | Value |
| --- | --- |
| Frame length | 5 ms |
| Bandwidth | 10 MHz |
| RF frequency | 2.5 GHz |
| Velocity | 30, 120 km/h |
| Pilot pattern | PUSC, OPUSC, our proposal |
| Channel modeling | Veh-A, Veh-B |

It is recognized that each 802.16m frame includes eight sub-frames. Each sub-frame can be assigned for either DL or UL transmission depending on the duplexing scheme. There are two types of sub-frames: 1) the regular sub-frame that includes 6 OFDMA symbols and 2) the irregular sub-frame that comprises 5 OFDMA symbols. One sub-frame is the minimum unit in time domain for resource allocation. To adapt to this frame structure, the following pilot pattern, which is based on the tile structure in FIG. 5A. Assuming n regular subframes (2n slots, n is a positive integer) adjacent in time domain are allocated to one burst of a MS 101, then, there are 6 sequences of tiles adjacent in time domain allocated to the MS, and there are 2n tiles in each tile sequence. For all the 2n tiles, the pilot pattern defined in FIG. 5A is used. One example is shown in FIG. 6C.

Figure 6C:
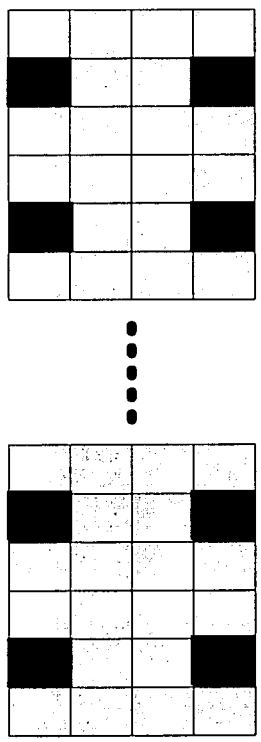

FIG. 6C shows an example for the pilot structure 605 in the new 16m sub-frame. If there is an irregular subframe in the allocation, the irregular subframe may exist at the end. Then, the pilot structure is as shown in FIG. 6D.

Figure 6D:
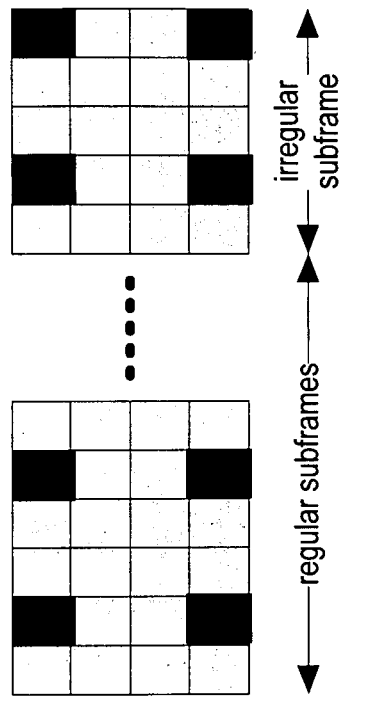

FIG. 6D shows an example for a pilot structure 607 frame that takes into account the irregular sub-frame. To further enable other possible pilot structures, an approach, according to one embodiment, provides that the 2n tiles could be any combination of the tile in FIG. 5A and the 16e PUSC tile (or any other tile structure with the same size as PUSC tile, i.e., 4*3 subcarriers in frequency-time domain).

FIGS. 6E and 6F illustrate other exemplary structures 609 and 611, respectively, of multi-antenna applications.

The computational results are shown in FIGS. 9A-9D. Over all the channel models, PSUC and the new pilot pattern have very similar channel estimation MSE. The degradation by using the new pilot pattern is less than 1 dB. OPUSC has much worse channel estimation MSE in all the cases. Over Veh-A channels, where coherence bandwidth is small, the new pilot pattern has a 2~3 dB gain in MSE over OPUSC. Over Veh-B channels where coherence bandwidth is large, the channel estimation MSE of OPUSC has an obvious error floor.

Therefore, when best channel estimation is used, the new pilot pattern has little degradation (e.g., <1 dB) in terms of MSE compared with PUSC and outperforms OPUSC when coherence bandwidth of the channel is large. It is noted that BER (Bit Error Ratio) simulation was not employed to compare the performance of various pilot patterns because BER performance depends much on the specific modulation and coding schemes (MCS). With different MCS, various channel estimation method could lead to very different BER performance. Therefore, the channel estimation MSE is a better choice to explore the influence of pilot pattern on the system performance.

Figure 7A:
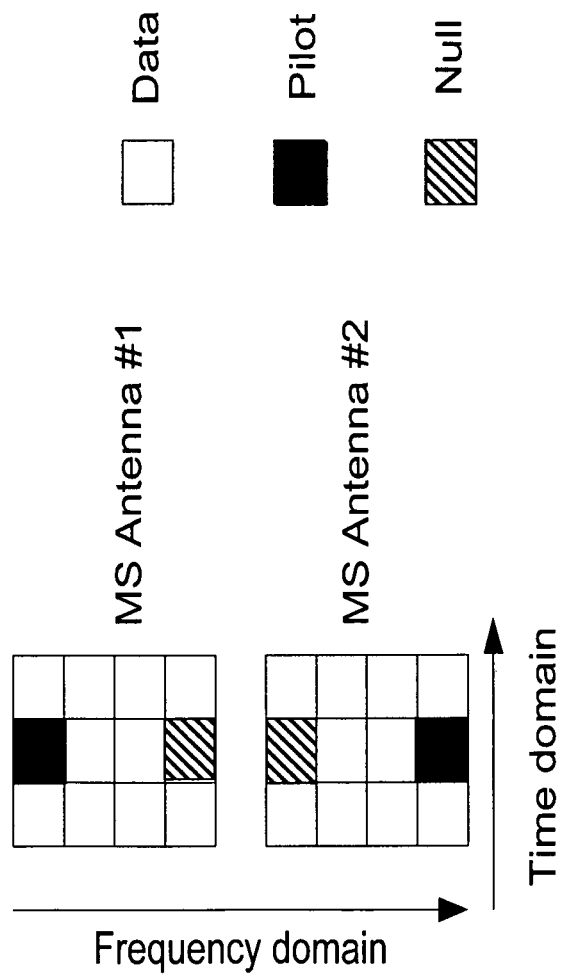
FIGS. 7A and 7B are diagrams, respectively, of a tile with a pilot pattern for use in a multi-antenna scenario, and exemplary sequences of tiles utilizing the tile of FIG. 7A, according to various embodiments.
Figure 7B:
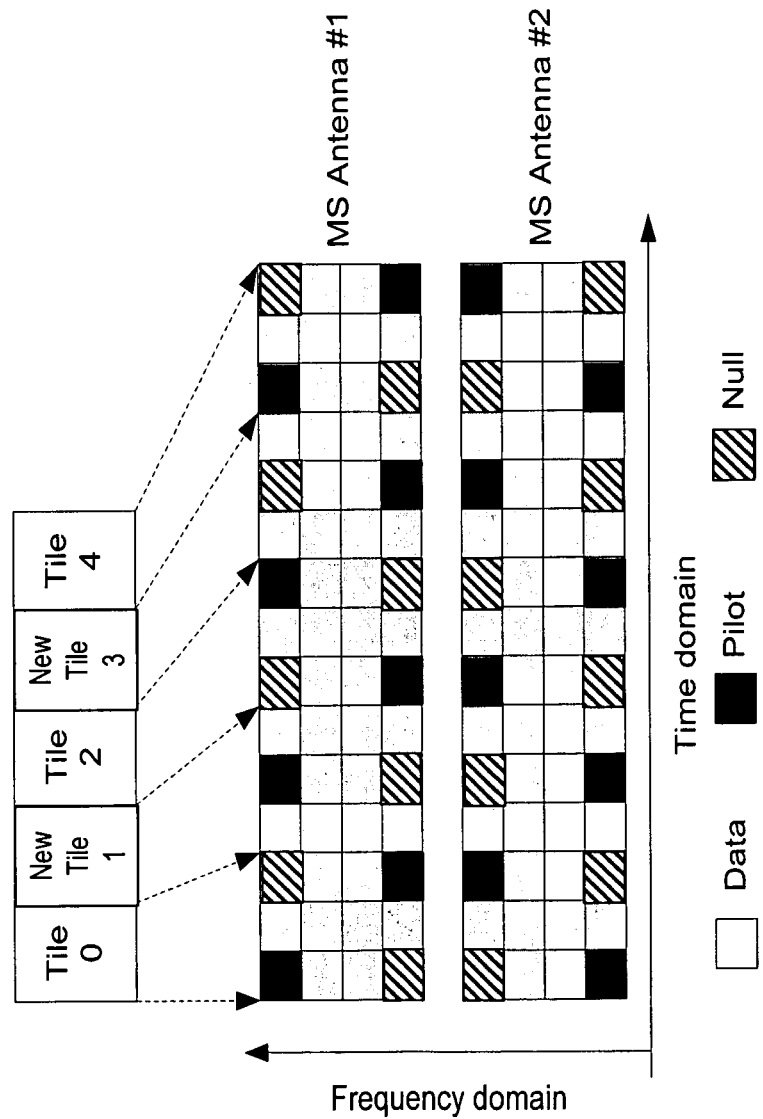

FIGS. 7A and 7B are diagrams, respectively, of a tile with a pilot pattern for use in a multi-antenna scenario, and exemplary sequences of tiles utilizing the tile of FIG. 7A, according to various embodiments. The pilot pattern 501 of FIG. 5A can be extended to the multi-antenna case, including STC, 2*2 MIMO (Multiple Input and Multiple Output) and UL collaborative MIMO. The new pilot pattern is given by the following rule (see FIG. 8B). A new pilot pattern 701 for two transmission antennas is defined in FIG. 7A. As compared to the 16e PUSC tile, the number of pilot subcarriers is reduced from 4 to 2. It is assumed that n (>2) slots adjacent in time domain are allocated to one burst of a MS 101. Consequently, there are 6 sequences of tiles adjacent in time domain are allocated to the MS 101, and there are n tiles in each tile sequence. For each sequence of tiles, each of the n tiles is assigned a natural index k, k=0, 1, ..., n−1.

For the tiles whose indexes are k=2j+1, j=0, 1, ..., ⌊(n−1)/2⌋−1, the new pilot pattern 701 is applied. As mentioned, in the alternative, for the tiles whose indexes are k=2j, j=0, 1, ..., ⌊(n−1)/2⌋−1, the pilot pattern 501 can be defined as in FIG. 5A. For other tiles, the 802.16e pilot pattern is used according to section 8.4.8.1.5 in IEEE 802.16e-2005, "IEEE Standard for Local and Metropolitan Area Networks—Part 16: Air Interface for Fixed and Mobile Broadband Wireless Access Systems," Feb. 28, 2006. After the pilot pattern of the tiles is given by the previous step, transmit antenna #1 of the tiles with indices k=4i+2 and k=4i+3 alters the pilot pattern with transmit antenna #2, i=0, 1, ..., $\lfloor(n-1)/4\rfloor-1$.

It is noted that for the case of UL collaborative MIMO, the $1^{st}$ antenna means the transmit antenna of the $1^{st}$ MS, and the $2^{nd}$ antenna means the transmit antenna of the $2^{nd}$ MS. According to the above rule for the case of n=5, the pilot pattern 703 of FIG. 7B results.

Figure 8A:
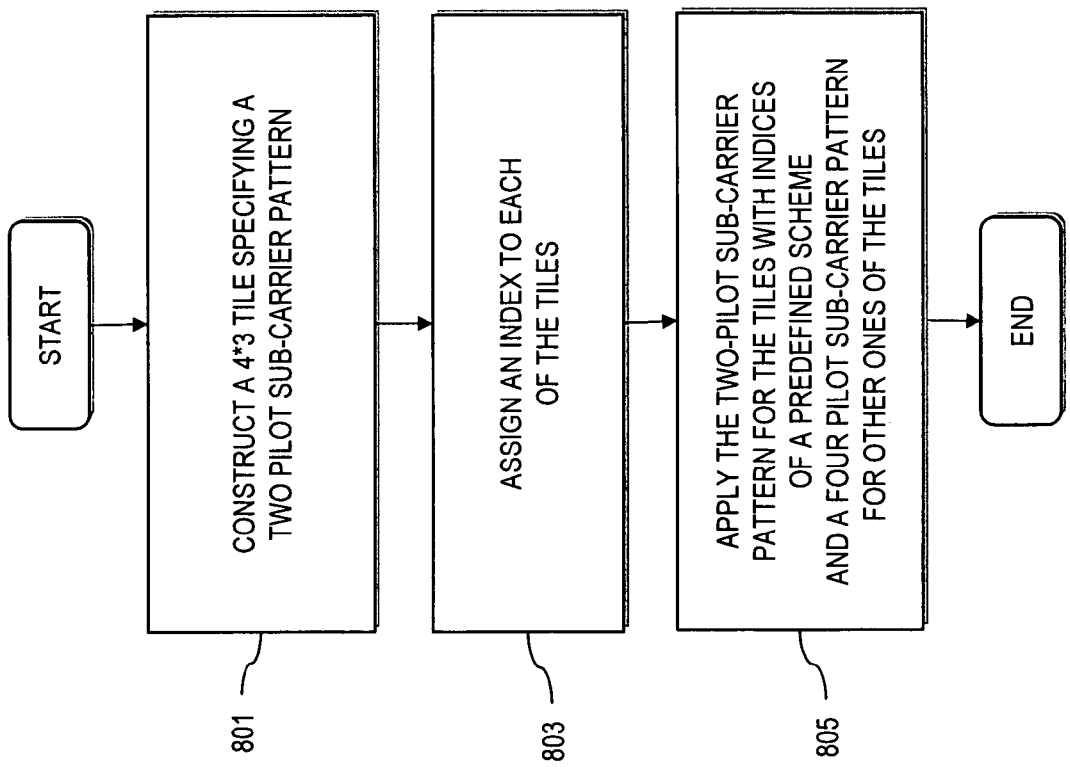
FIGS. 8A and 8B are flowcharts of processes for constructing tiles, according to various exemplary embodiments.
Figure 8B:
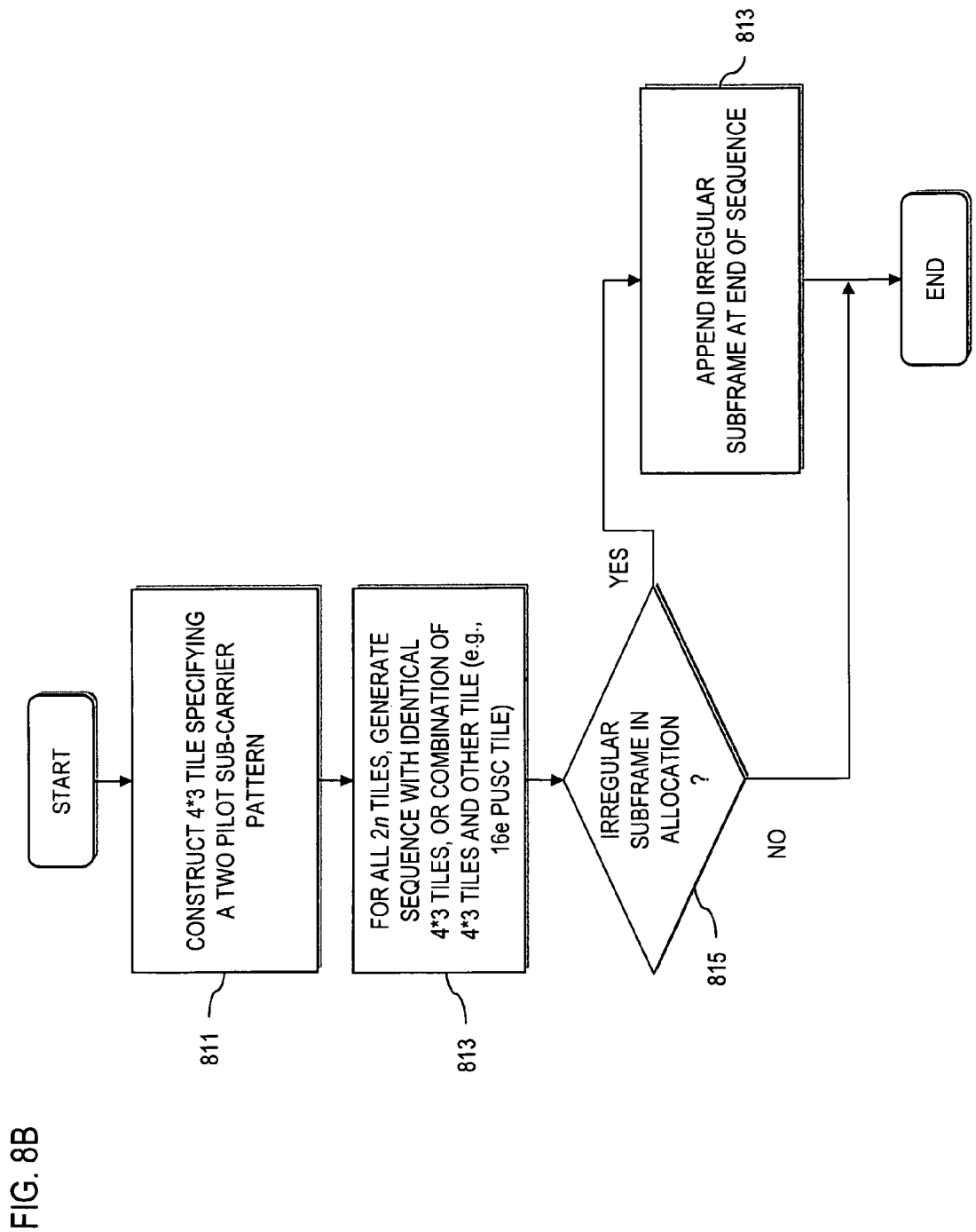
Figure 9B:
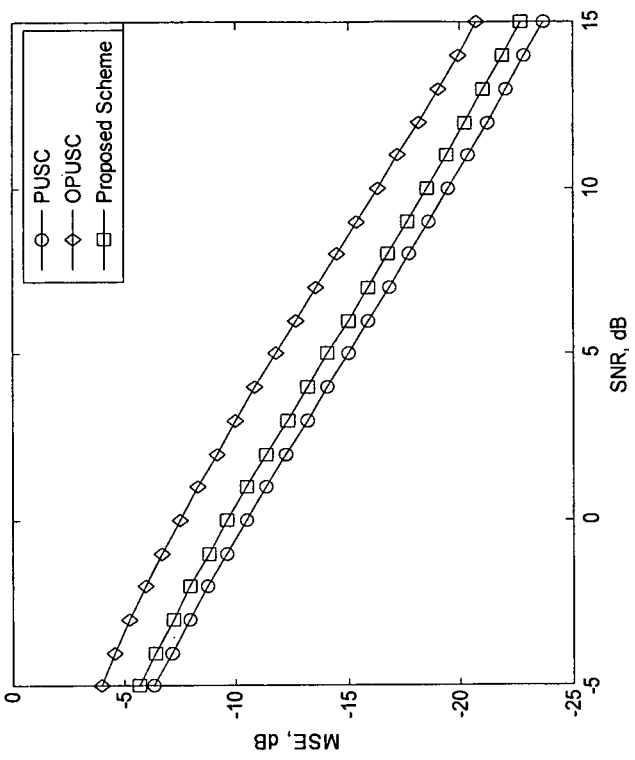
FIGS. 9A-9D are computational results of the Wiener channel estimation mean square error (MSE) comparison, according to various embodiments.
Figure 9A:
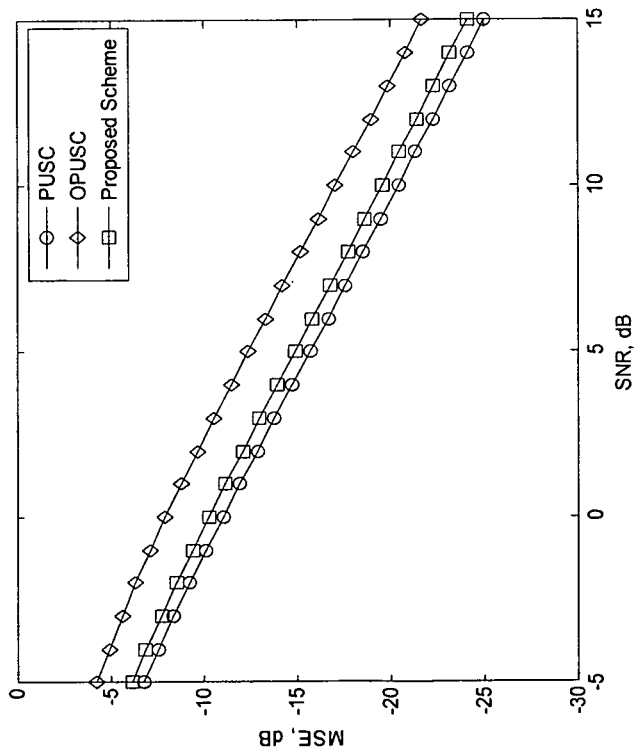
Figure 9C:
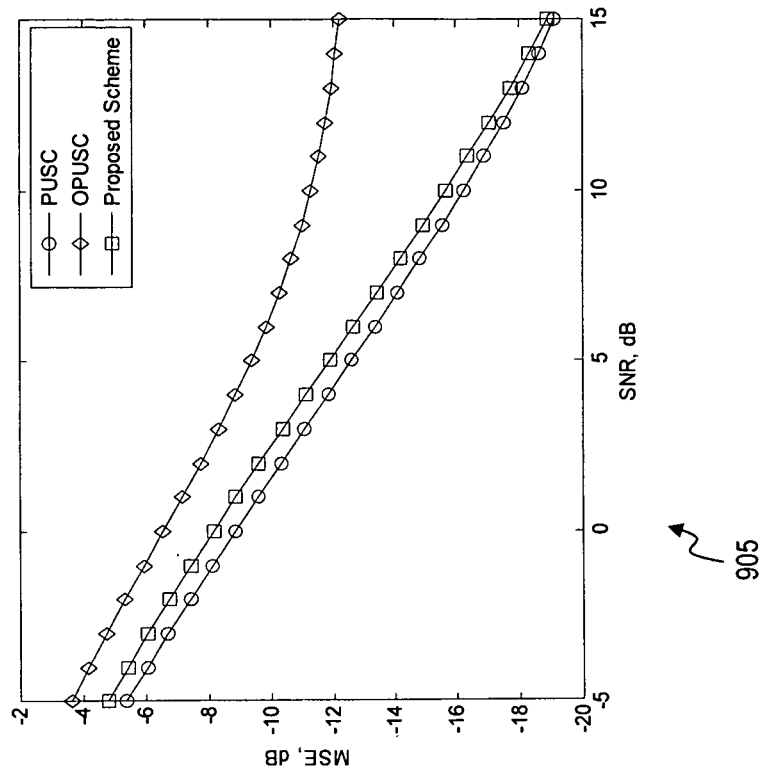
Figure 9D:
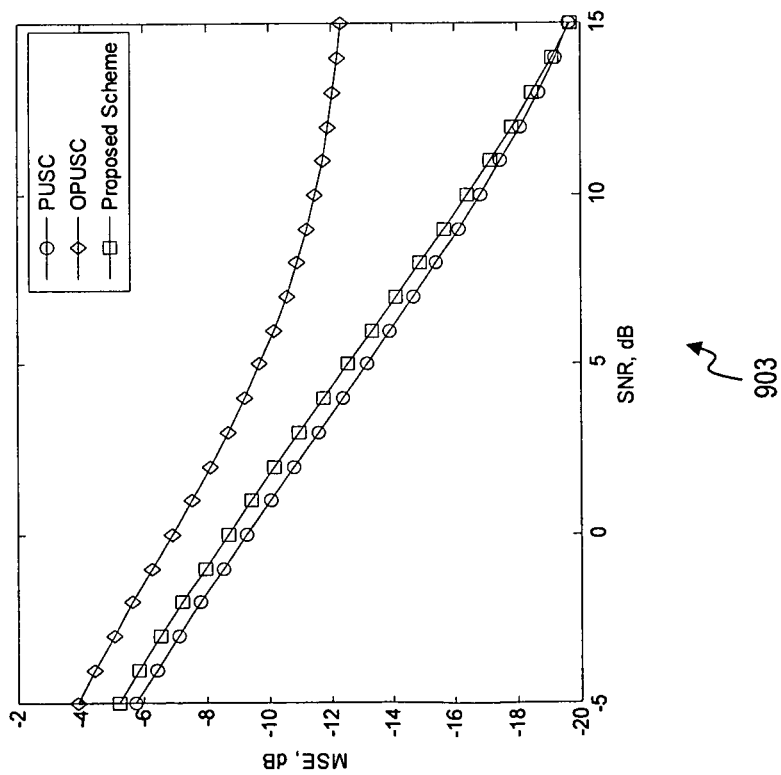

FIGS. 8A and 8B are flowcharts of processes for constructing tiles, according to various exemplary embodiments. In step 801, a 4*3 tile is constructed, in which the tile specifies a two pilot sub-carrier pattern for either a single antenna system or multi-antenna system. Next, an index, k, is assigned, as in step 803, to each of the tiles, wherein k=0, 1, ..., n−1 (where n is an integer and represents the number of tiles). In step 805, the two-pilot sub-carriers pattern is applied for the tiles with indices of a predetermined scheme k=2j+1, or k=2j, j=0, 1 ..., $\lfloor(n-1)/2\rfloor-1$, and a four pilot sub-carrier pattern for other ones of the tiles.

In the multi-antenna case, a first transmit antenna of the tiles with indices k=4i+2 and k=4i+3 alters the pilot pattern with a second transmit antenna, i=0, 1 ..., $\lfloor(n-1)/4\rfloor-1$.

It is contemplated that this can be deployed in an 802.16 network. In such a system, with respect to the mobile station, new TLVs (type/length/value) can be defined in the RNG-REQ (Ranging Request) and RNG-RSP (Ranging Response) messages. By handshake of the TLVs, the base station and the mobile station can negotiate whether all the transmission in UL PUSC zone of the mobile is to employ the new pilot patterns.

In addition, the process of FIG. 8B generates a sequence that comprises the tile structures 605-611 of FIGS. 6C-6F.

In steps 811 and 813, a 4*3 tile is created with the two pilot sub-carrier, in which for all 2n tiles, a sequence with identical 4*3 tiles, or a combination of the 4*3 tile and other tiles (e.g., 16 e PUSC tile) is generated. The process then determines whether this is a irregular subframe, as in step 815; if so, the irregular subframe is appended at the end of the sequence.

As for the transmission burst, a new field can be defined in UL-MAP-IE to indicate the use of the method. Accordingly, the base station can determine which burst is using the new pilot pattern. It is noted that there are no reserved bits in the "duration" of UL-MAP-IE. However, the 10-bit "duration" can be changed to 9-bit, in which the saved bit can be used as the indication bit.

The described arrangement, accordingly to certain embodiments, increases UL bandwidth efficiency in the UL PUSC zone.

FIGS. 9A-9D are computational results of the Wiener channel estimation mean square error (MSE) comparison, according to various embodiments. As seen in the graphs 901, 903, 905, and 907, the new pattern exhibits performance between the PUSC scheme and the OPUSC scheme.

Figure 10A:
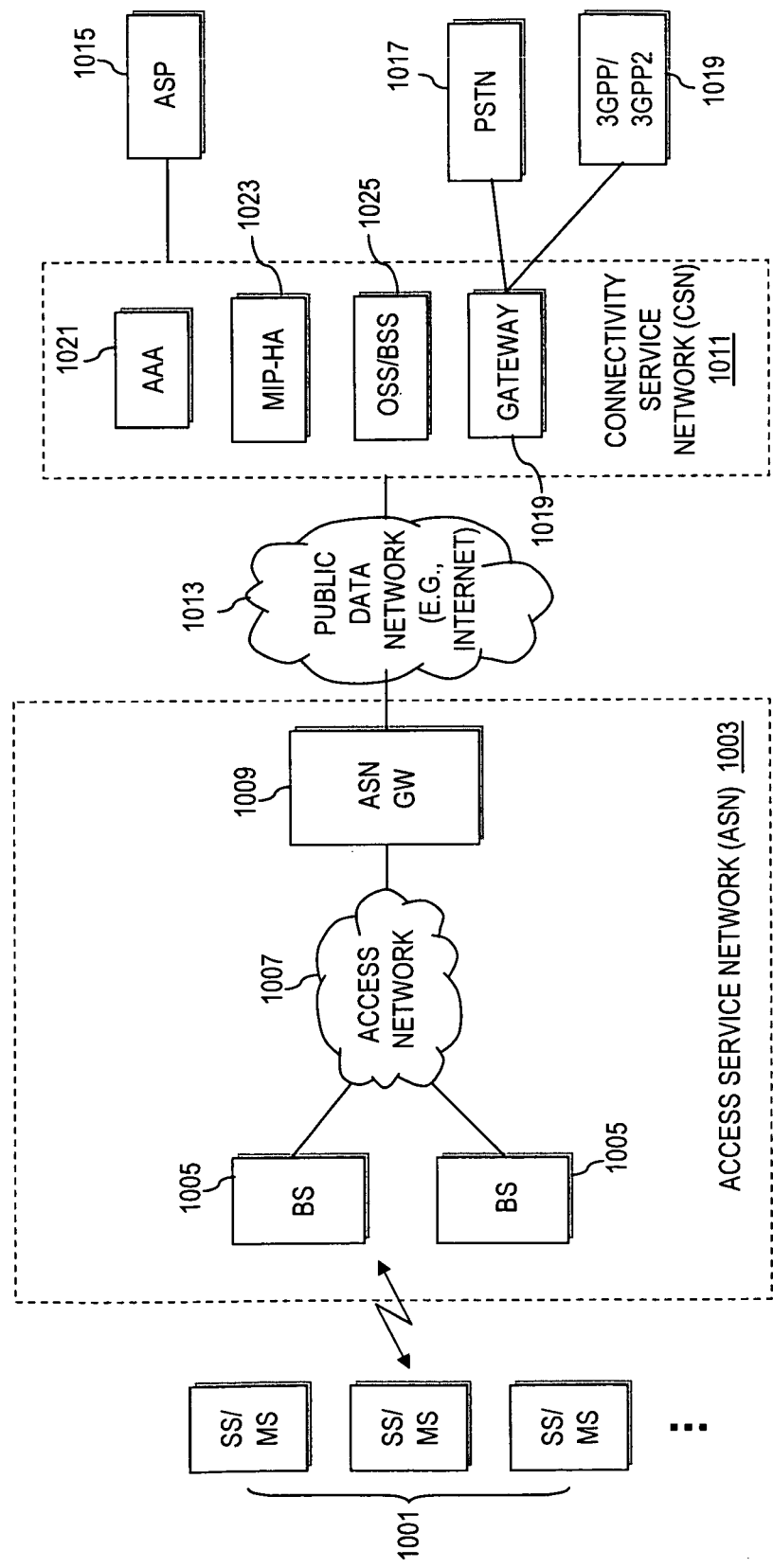
FIGS. 10A and 10B are diagrams of an exemplary WiMAX (Worldwide Interoperability for Microwave Access) architecture, in which the system of FIG. 1 can operate, according to various exemplary embodiments of the invention.
Figure 10B:
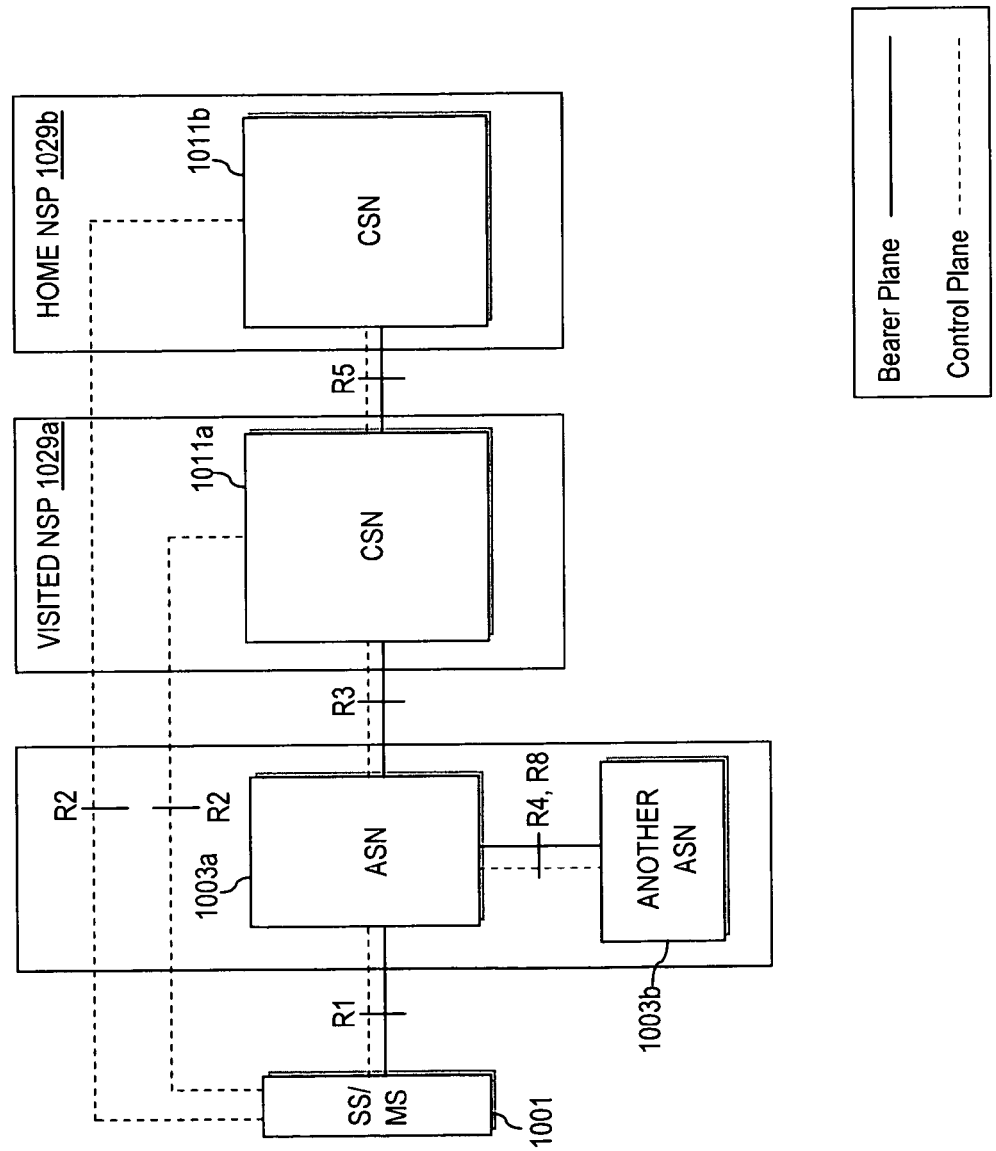

FIGS. 10A and 10B are diagrams of an exemplary WiMAX architecture, in which the system of FIG. 1, according to various exemplary embodiments of the invention. The architecture shown in FIGS. 10A and 10B can support fixed, nomadic, and mobile deployments and be based on an Internet Protocol (IP) service model. Subscriber or mobile stations 1001 can communicate with an access service network (ASN) 1003, which includes one or more base stations (BS) 1005. In this exemplary system, the BS 1005, in addition to providing the air interface to the mobile stations 1001, possesses such management functions as handoff triggering and tunnel establishment, radio resource management, quality of service (QoS) policy enforcement, traffic classification, DHCP (Dynamic Host Control Protocol) proxy, key management, session management, and multicast group management.

The base station 1005 has connectivity to an access network 1007. The access network 1007 utilizes an ASN gateway 1009 to access a connectivity service network (CSN) 1011 over, for example, a data network 1013. By way of example, the network 1013 can be a public data network, such as the global Internet.

The ASN gateway 1009 provides a Layer 2 traffic aggregation point within the ASN 1003. The ASN gateway 1009 can additionally provide intra-ASN location management and paging, radio resource management and admission control, caching of subscriber profiles and encryption keys, AAA client functionality, establishment and management of mobility tunnel with base stations, QoS and policy enforcement, foreign agent functionality for mobile IP, and routing to the selected CSN 1011.

The CSN 1011 interfaces with various systems, such as application service provider (ASP) 1015, a public switched telephone network (PSTN) 1017, and a Third Generation Partnership Project (3GPP)/3GPP2 system 1019, and enterprise networks (not shown).

The CSN 1011 can include the following components: Access, Authorization and Accounting system (AAA) 1021, a mobile IP-Home Agent (MIP-HA) 1023, an operation support system (OSS)/business support system (BSS) 1025, and a gateway 1027. The AAA system 1021, which can be implemented as one or more servers, provide support authentication for the devices, users, and specific services. The CSN 1011 also provides per user policy management of QoS and security, as well as IP address management, support for roaming between different network service providers (NSPs), location management among ASNs.

FIG. 10B shows a reference architecture that defines interfaces (i.e., reference points) between functional entities capable of supporting various embodiments of the invention. The WiMAX network reference model defines reference points: R1, R2, R3, R4, and R5. R1 is defined between the SS/MS 1001 and the ASN 1003a; this interface, in addition to the air interface, includes protocols in the management plane. R2 is provided between the SS/MS 1001 and a CSN (e.g., CSN 1011a and 1011b) for authentication, service authorization, IP configuration, and mobility management. The ASN 1003a and CSN 1011a communicate over R3, which supports policy enforcement and mobility management.

R4 is defined between ASNs 1003a and 1003b to support inter-ASN mobility. R5 is defined to support roaming across multiple NSPs (e.g., visited NSP 1029a and home NSP 1029b).

As mentioned, other wireless systems can be utilized, such as 3GPP LTE, as next explained.

FIGS. 11A-11C are diagrams of communication systems having exemplary long-term evolution (LTE) architectures, in which the user equipment (UE) and the base station of FIG. 1A can operate, according to various exemplary embodiments. By way of example (shown in FIG. 11A), a base station (e.g., destination node) and a user equipment (UE) (e.g., source node) can communicate in system 1100 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA. As seen, base stations 113a-103n constitute a radio network of eNBs as EUTRAN.

The communication system 1100 is compliant with 3GPP LTE, entitled "Long Term Evolution of the 3GPP Radio Technology" (which is incorporated herein by reference in its entirety). As shown in FIG. 11A, one or more user equipment (UEs) communicate with a network equipment, such as a base station 113, which is part of an access network (e.g., WiMAX (Worldwide Interoperability for Microwave Access), 3GPP LTE (or E-UTRAN), etc.). Under the 3GPP LTE architecture, base station 113 is denoted as an enhanced Node B (eNB).

MME (Mobile Management Entity)/Serving Gateways 1101 are connected to the eNBs 113 in a full or partial mesh configuration using tunneling over a packet transport network (e.g., Internet Protocol (IP) network) 1103. Exemplary functions of the MME/Serving GW 1101 include distribution of paging messages to the eNBs 113, termination of U-plane packets for paging reasons, and switching of U-plane for support of UE mobility. Since the GWs 1101 serve as a gateway to external networks, e.g., the Internet or private networks 1103, the GWs 1101 include an Access, Authorization and Accounting system (AAA) 1105 to securely determine the identity and privileges of a user and to track each user's activities. Namely, the MME Serving Gateway 1101 is the key control-node for the LTE access-network and is responsible for idle mode UE tracking and paging procedure including retransmissions. Also, the MME 1101 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

In FIG. 11B, a communication system 1102 supports GERAN (GSM/EDGE radio access) 1104, and UTRAN 1106 based access networks, E-UTRAN 1112 and non-3GPP (not shown) based access networks, and is more fully described in TR 23.882, which is incorporated herein by reference in its entirety. A key feature of this system is the separation of the network entity that performs control-plane functionality (MME 1108) from the network entity that performs bearer-plane functionality (Serving Gateway 1110) with a well defined open interface between them S11. Since E-UTRAN 1112 provides higher bandwidths to enable new services as well as to improve existing ones, separation of MME 1108 from Serving Gateway 1110 implies that Serving Gateway 1110 can be based on a platform optimized for signaling transactions. This scheme enables selection of more cost-effective platforms for, as well as independent scaling of, each of these two elements. Service providers can also select optimized topological locations of Serving Gateways 1110 within the network independent of the locations of MMEs 1108 in order to reduce optimized bandwidth latencies and avoid concentrated points of failure.

As seen in FIG. 11B, the E-UTRAN (e.g., eNB) 1112 interfaces with UE 111 via LTE-Uu. The E-UTRAN 1112 supports LTE air interface and includes functions for radio resource control (RRC) functionality corresponding to the control plane MME 1108. The E-UTRAN 1112 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 1108, as a key control node, is responsible for managing mobility UE identifies and security parameters and paging procedure including retransmissions. The MME 1108 is involved in the bearer activation/deactivation process and is also responsible for choosing Serving Gateway 1110 for the UE 111. MME 1108 functions include Non Access Stratum (NAS) signaling and related security. MME 1108 checks the authorization of the UE 111 to camp on the service provider's Public Land Mobile Network (PLMN) and enforces UE 111 roaming restrictions. The MME 1108 also provides the control plane function for mobility between LTE and 2G/3G access networks with the S3 interface terminating at the MME 1108 from the SGSN (Serving GPRS Support Node) 1114.

The SGSN 1114 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 1108 and HSS (Home Subscriber Server) 1116. The S10 interface between MMEs 1108 provides MME relocation and MME 1108 to MME 1108 information transfer. The Serving Gateway 1110 is the node that terminates the interface towards the E-UTRAN 1112 via S1-U.

The S1-U interface provides a per bearer user plane tunneling between the E-UTRAN 1112 and Serving Gateway 1110. It contains support for path switching during handover between eNBs 113. The S4 interface provides the user plane with related control and mobility support between SGSN 1114 and the 3GPP Anchor function of Serving Gateway 1110.

The S6 is an interface between UTRAN 1106 and Serving Gateway 1110. Packet Data Network (PDN) Gateway 1118 provides connectivity to the UE 111 to external packet data networks, (e.g. Internet or Intranet) by being the point of exit and entry of Internet traffic for the UE 111. The PDN Gateway 1118 performs policy enforcement, packet filtering for each user, charging support, lawful interception and packet screening. Another role of the PDN Gateway 1118 is to act as the anchor for mobility between 3GPP and non-3GPP technologies such as WiMax and 3GPP2 (CDMA 1X and EvDO (Evolution Data Only)).

The S7 interface provides transfer of QoS policy and charging rules from PCRF (Policy and Charging Role Function) 1120 to Policy and Charging Enforcement Function (PCEF) in the PDN Gateway 1118. The SGi interface is the interface between the PDN Gateway and the operator's IP services including packet data network 1122. Packet data network 1122 may be an operator external public or private packet data network or an intra operator packet data network, e.g., for provision of IMS (IP Multimedia Subsystem) services. Rx+ is the interface between the PCRF and the packet data network 1122.

As seen in FIG. 11C, the eNB 113 utilizes an E-UTRA (Evolved Universal Terrestrial Radio Access) (user plane, e.g., RLC (Radio Link Control) 1115, MAC (Media Access Control) 1117, and PHY (Physical) 1119, as well as a control plane (e.g., RRC 1121)). These functions are also provided within the UE 111. The eNB 113 also includes the following functions: Inter Cell RRM (Radio Resource Management) 1123, Connection Mobility Control 1125, RB (Radio Bearer) Control 1127, Radio Admission Control 1129, eNB Measurement Configuration and Provision 1131, and Dynamic Resource Allocation (Scheduler) 1133.

The eNB 113 communicates with the aGW 1101 (Access Gateway) via an S1 interface. The aGW 1101 includes a Control plane 1101*a* and a User Plane 1101*b*. aGW is a conceptual notation inclusive of MME in the control plane and PDN/serving gateways in the user plane. Evolve Packet Core is the core network architecture that in addition to MME and PDN/serving gateways consists of server architecture e.g. for Internet Multimedia Subsystem (IMS).

The user plane 1101*b* includes PDN/Serving gateway functionalities 1145, e.g. management of PDP context (Packet Data Protocol context) 1140, and a User plane Mobility Anchoring function 1147. It is noted that the functionality of the aGW 1101 can also be provided by a combination of a serving gateway (SGW) and a packet data network (PDN) GW. The aGW 1101 can also interface with a packet network, such as the Internet 1143. PDP (Packet Data protocol) context defines the IP connectivity parameters e.g. QoS.

The control plane 1101*b* provides the following components as the Mobility Management Entity (MME): SAE (System Architecture Evolution) Bearer Control 1151, Idle State Mobility Handling 1153, and NAS (Non-Access Stratum) Security 1155.

One of ordinary skill in the art would recognize that the processes for acknowledgement signaling may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 12:
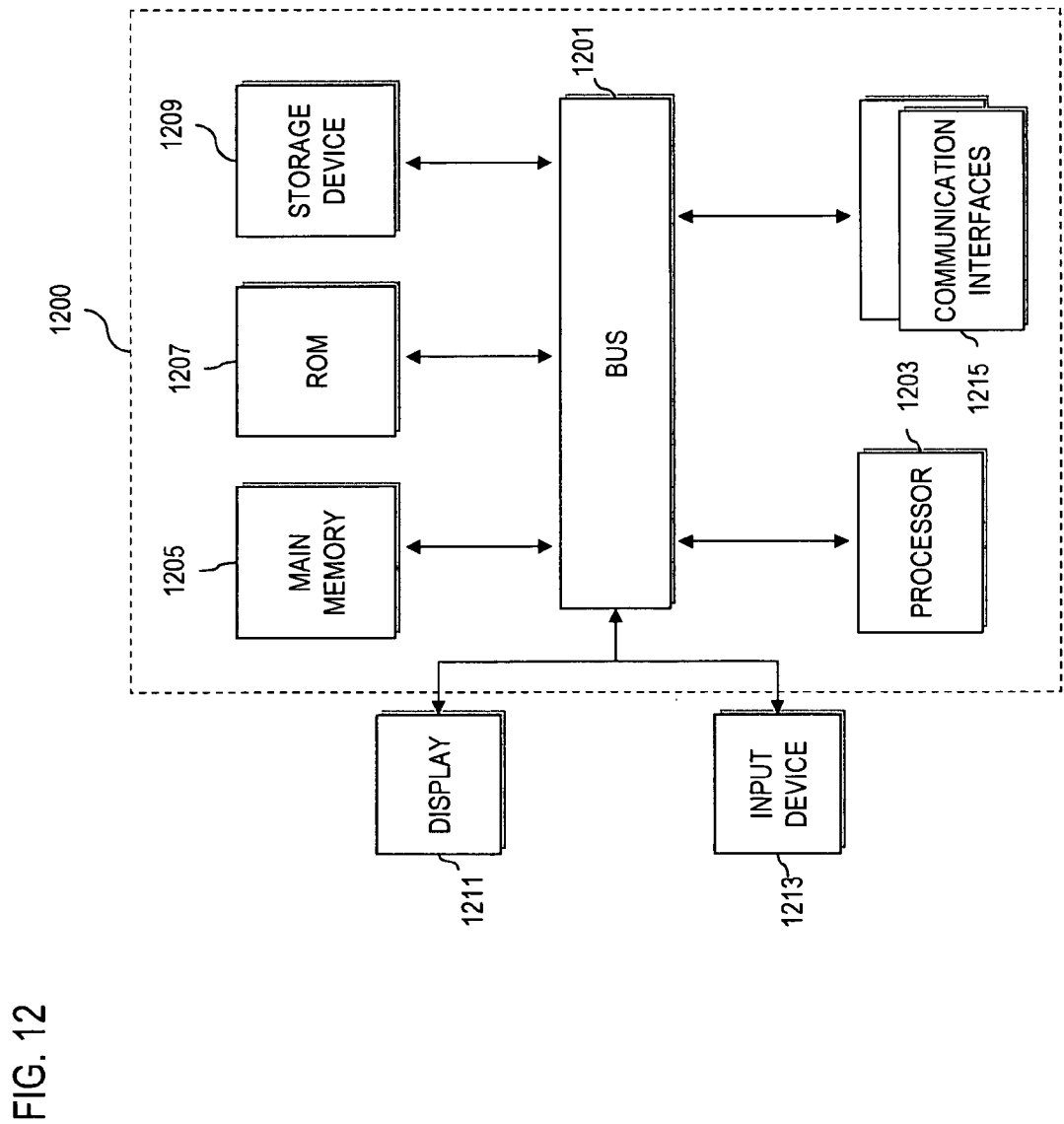
FIG. 12 is a diagram of hardware that can be used to implement an embodiment of the invention.

FIG. 12 illustrates exemplary hardware upon which various embodiments of the invention can be implemented. A computing system 1200 includes a bus 1201 or other communication mechanism for communicating information and a processor 1203 coupled to the bus 1201 for processing information. The computing system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions by the processor 1203. The computing system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computing system 1200 may be coupled via the bus 1201 to a display 1211, such as a liquid crystal display, or active matrix display, for displaying information to a user. An input device 1213, such as a keyboard including alphanumeric and other keys, may be coupled to the bus 1201 for communicating information and command selections to the processor 1203. The input device 1213 can include a cursor control, such as a mouse, a trackball, or cursor direction keys, for communicating direction information and command selections to the processor 1203 and for controlling cursor movement on the display 1211.

According to various embodiments of the invention, the processes described herein can be provided by the computing system 1200 in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1200 also includes at least one communication interface 1215 coupled to bus 1201. The communication interface 1215 provides a two-way data communication coupling to a network link (not shown). The communication interface 1215 sends and receives electrical, electromagnetic, or optical signals that carry digital data streams representing various types of information. Further, the communication interface 1215 can include peripheral interface devices, such as a Universal Serial Bus (USB) interface, a PCMCIA (Personal Computer Memory Card International Association) interface, etc.

The processor 1203 may execute the transmitted code while being received and/or store the code in the storage device 1209, or other non-volatile storage for later execution. In this manner, the computing system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 13:
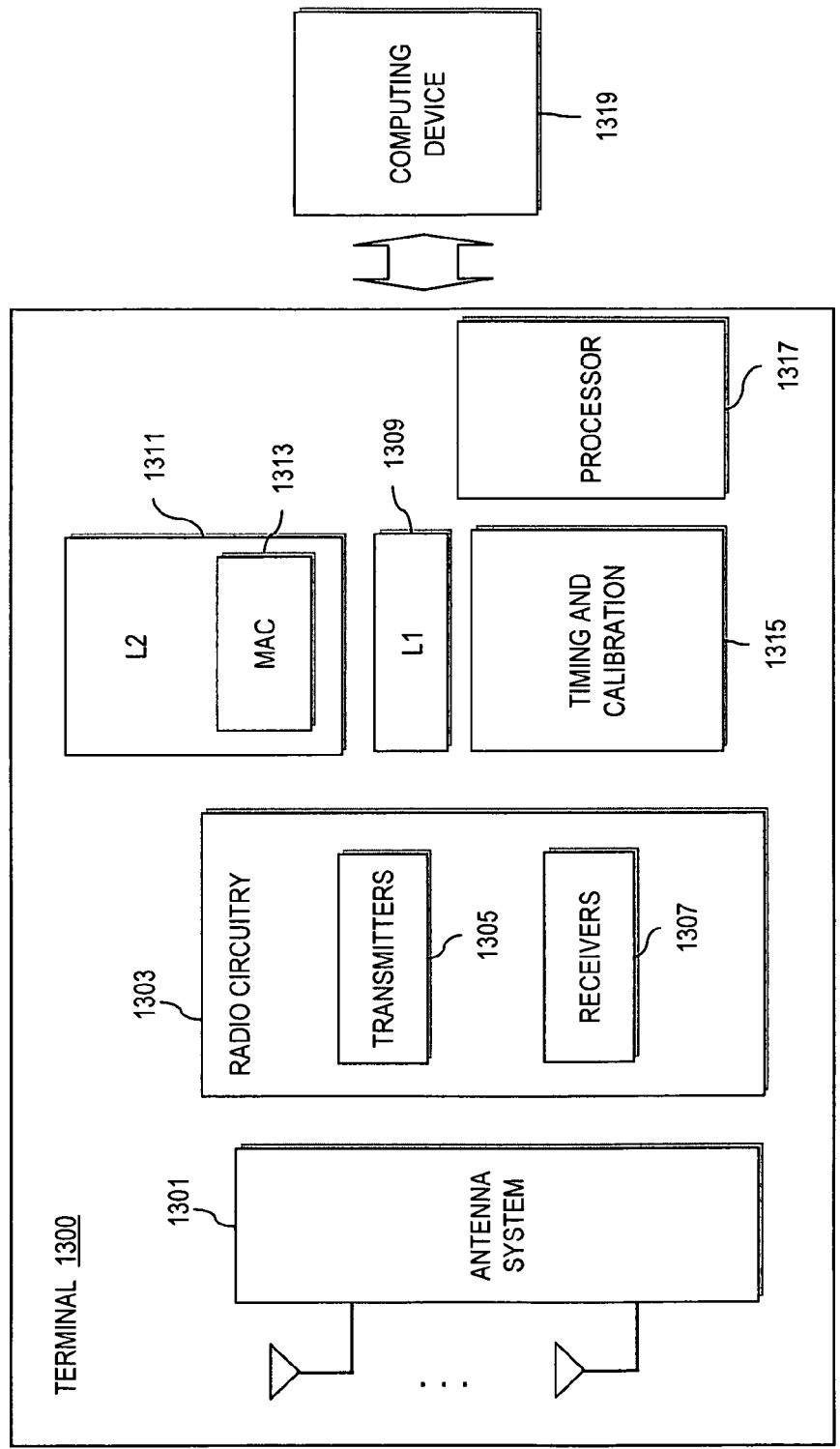
FIG. 13 is a diagram of exemplary components of a user terminal, according to an embodiment of the invention.

FIG. 13 is a diagram of exemplary components of a user terminal, according to an embodiment of the invention. A user terminal 1300 includes an antenna system 1301 (which can utilize multiple antennas) to receive and transmit signals. The antenna system 1301 is coupled to radio circuitry 1303, which includes multiple transmitters 1305 and receivers 1307. The radio circuitry encompasses all of the Radio Frequency (RF) circuitry as well as base-band processing circuitry. As shown, layer-1 (L1) and layer-2 (L2) processing are provided by units 1309 and 1311, respectively. Optionally, layer-3 functions can be provided (not shown). L2 unit 1311 can include module 1313, which executes all Medium Access Control (MAC) layer functions. A timing and calibration module 1315 maintains proper timing by interfacing, for example, an external timing reference (not shown). Additionally, a processor 1317 is included. Under this scenario, the user terminal 1300 communicates with a computing device 1319, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
generating a sequence of tiles via a processor, tiles in the sequence of tiles being arranged to avoid pilot sub-carriers adjacent in a time domain by utilizing different pilot patterns;
generating a transmission signal, via the processor, according to the generated sequence of tiles; and
transmitting the transmission signal over a network,
wherein the different pilot patterns are utilized when each tile in the sequence of tiles has a same pilot pattern and avoids at least two pilot sub-carriers in immediately adjacent tiles of the sequence of tiles being immediately adjacent to each other in the time domain.

2. A method according to claim 1, further comprising: transmitting the transmission signal is over an uplink established over the network.

3. A method according to claim 1, wherein each of the tiles is a 4*3 tile, one of the tiles specifying a pattern having two pilot sub-carriers and another one of the tiles specifying a pattern having four pilot sub-carriers.

4. A method according to claim 3, further comprising:
assigning an index, k, to each of the tiles, wherein k=0, 1, . . . ,n−1 and n is the number of tiles, applying the pattern having two-pilot sub-carriers for the tiles with indices k=2j+1, or k=2j, wherein j=0,1, . . . , $\lfloor (n-1)/2 \rfloor -1$; and
applying the pattern having four pilot sub-carriers for remaining ones of the tiles.

5. A method according to claim 3, further comprising:
assigning an index, k, to each of the tiles, wherein k=0, 1, . . . ,n−1 and n is the number of tiles,
applying the pattern having two-pilot sub-carriers for the tiles with indices k=4i+2 and k=4i+3, wherein i=0, 1 . . . , $\lfloor (n-1)/4 \rfloor -1$; and
applying the pattern having four pilot sub-carriers for remaining ones of the tiles.

6. A method according to claim 4, wherein channel estimation of one of the tiles is executed using linear computation based on pilot sub-carriers of a combination of the tiles.

7. A method according to claim 1, wherein the tiles corresponds to sub-carriers within a time-frequency domain.

8. A method according to claim 1, wherein the network is compliant with an IEEE (Institute of Electrical & Electronics Engineers) 802.16 architecture or a WiMAX (Worldwide Interoperability for Microwave Access) architecture.

9. A non-transitory computer-readable storage medium carrying one or more sequences of one or more instructions which, when executed by one or more processors, cause the one or more processors to:
generate a sequence of tiles, tiles in the sequence of the tiles being arranged to avoid pilot sub-carriers adjacent in a time domain by utilizing different pilot patterns;
generating a transmission signal according to the generated sequence of tiles; and
transmitting the transmission signal over a network,
wherein the different pilot patterns are utilized when each tile in the sequence of tiles has a same pilot pattern and avoids at least two pilot sub-carriers in immediately adjacent tiles of the sequence of tiles being immediately adjacent to each other in the time domain.

10. An apparatus comprising:
logic gates configured to generate a sequence of tiles, tiles in the sequence of the tiles being arranged to avoid pilot sub-carriers adjacent in a time domain by utilizing different pilot patterns,
wherein the logic gates includes sublogic gates configured to generate a transmission signal according to the generated sequence of tiles, and
a transceiver configured to transmit the transmission signal over a network,
wherein the different pilot patterns are utilized when each tile in the sequence of tiles has a same pilot pattern and avoids at least two pilot sub-carriers in immediately adjacent tiles of the sequence of tiles being immediately adjacent to each other in the time domain.

11. An apparatus according to claim 10, further comprising: the transceiver is configured to transmit the transmission signal over an uplink established over the network.

12. An apparatus according to claim 10, wherein each of the tiles is a 4*3 tile, one of the tiles specifying a pattern having two pilot sub-carriers and another one of the tiles specifying a pattern having four pilot sub-carriers.

13. An apparatus according to claim 12, wherein the logic gates are further configured to assign an index, k, to each of the tiles, wherein k=0, 1, . . . ,n−1 and n is the number of tiles, to apply the pattern having two-pilot sub-carriers for the tiles with indices k=2j+1, or k=2j, wherein j=0, 1 . . . , $\lfloor (n-1)/2 \rfloor -1$, and to apply the pattern having four pilot sub-carriers for remaining ones of the tiles.

14. An apparatus according to claim 12, wherein the logic gates are further configured to assign an index, k, to each of the tiles, wherein k=0, 1, . . . ,n−1 and n is the number of tiles, to apply the pattern having two-pilot sub-carriers for the tiles with indices k=4i+2 and k=4i+3 wherein i=0,1 . . . , $\lfloor (n-1)/4 \rfloor -1$, and to apply the pattern having four pilot sub-carriers for remaining ones of the tiles.

15. An apparatus according to claim 13, wherein channel estimation of one of the tiles is executed using linear computation based on pilot sub-carriers of a combination of the tiles.

16. An apparatus according to claim 10, wherein the tiles corresponds to sub-carriers within a time-frequency domain.

17. An apparatus according to claim 10, wherein the network is compliant with an IEEE (Institute of Electrical & Electronics Engineers) 802.16 architecture or a WiMAX (Worldwide Interoperability for Microwave Access) architecture.

18. A method comprising:
storing a first tile representing sub-carriers within a time-frequency domain, the stored first tile being a 4*3 tile with a pattern having two pilot sub-carriers;
storing a second tile representing sub-carriers within a time-frequency domain, the stored second tile being a 4*3 tile with a pattern having four pilot sub-carriers;
generating a sequence of tiles including the stored first tile and the stored second tile;
generating a transmission signal according to the generated sequence of tiles; and
transmitting the transmission signal over a network.

19. A method according to claim 18, wherein the sequence alternates use of the stored first tile and the stored second tile for a single-antenna system.

20. A method according to claim 18, wherein the sequence includes only one of the stored first tile for a multi-antenna system.

21. A method according to claim 18, wherein channel estimation of one time of the sequence of tiles is executed using linear computation based on pilot sub-carriers of a combination of the tiles.

22. A non-transitory computer-readable storage medium carrying one or more sequences of one or more instructions which, when executed by one or more processors, cause the one or more processors to:
store a first tile representing sub-carriers within a time-frequency domain, the stored first tile being a 4*3 tile with a pattern having two pilot sub-carriers;
store a second tile representing sub-carriers within a time-frequency domain, the stored second tile being a 4*3 tile with a pattern having four pilot sub-carriers;
generate a sequence of tiles including the stored first tile and the stored second tile;
generate a transmission signal according to the generated sequence of tiles; and
transmit the transmission signal over a network.

* * * * *